(12) United States Patent
Markov

(10) Patent No.: US 11,467,096 B1
(45) Date of Patent: Oct. 11, 2022

(54) SYSTEM, APPARATUS, AND METHOD FOR STRUCTURAL FAULT DETECTION

(71) Applicant: Advanced Systems & Technologies, Inc., Irvine, CA (US)

(72) Inventor: Vladimir Markov, Irvine, CA (US)

(73) Assignee: ADVANCED SYSTEMS AND TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 17/554,981

(22) Filed: Dec. 17, 2021

Related U.S. Application Data

(60) Provisional application No. 63/234,634, filed on Aug. 18, 2021.

(51) Int. Cl.
| | | |
|---|---|---|
| *G01N 21/88* | (2006.01) | |
| *G01B 11/16* | (2006.01) | |
| *B64C 39/02* | (2006.01) | |
| *G01H 9/00* | (2006.01) | |

(52) U.S. Cl.
CPC ......... *G01N 21/8806* (2013.01); *B64C 39/02* (2013.01); *G01B 11/16* (2013.01); *G01H 9/00* (2013.01); *B64C 2201/12* (2013.01)

(58) Field of Classification Search
CPC .............. G01N 21/8806; B64C 39/02; B64C 2201/12; G01B 11/16; G01H 9/00
See application file for complete search history.

(56) References Cited

U.S. PATENT DOCUMENTS

| | | | | |
|---|---|---|---|---|
| 2005/0036135 | A1* | 2/2005 | Earthman | ........... G01N 21/4738 356/237.1 |
| 2006/0260407 | A1* | 11/2006 | Donskoy | ............. G01N 29/2412 73/657 |
| 2012/0240682 | A1* | 9/2012 | Boon | ........................ G01H 9/00 73/657 |

FOREIGN PATENT DOCUMENTS

| | | | | |
|---|---|---|---|---|
| CN | 108886572 A | * | 11/2018 | ........... B64C 39/024 |
| WO | WO-2019218092 A1 | * | 11/2019 | ........... G01S 13/347 |

* cited by examiner

*Primary Examiner* — Roy M Punnoose
(74) *Attorney, Agent, or Firm* — Snell & Wilmer LLP

(57) ABSTRACT

A system, apparatus, and method for remotely detecting defects in a structure may proceed non-destructively. A mobile sensing platform may place sensors in a desired positioning relative to the structure. The desired position may include a non-contacting relation between the sensors and structure. The mobile sensing platform may project laser beams onto the structure and sense backscattered light via the sensors. Variations in the backscattered light may correspond to motion of the structure, such as vibrations. By calculating the frequency and amplitude of the vibrations, defects in the structure may be detected. By correcting for noise, such as that associated with acceleration of the mobile sensing platform, accuracy and precision of defect detection may be enhanced.

20 Claims, 18 Drawing Sheets

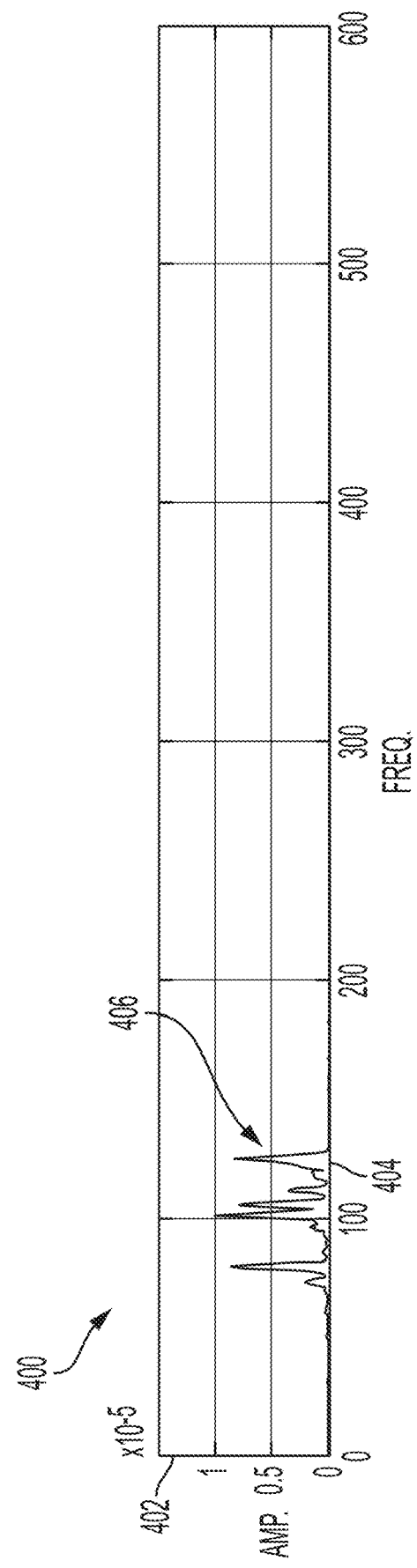

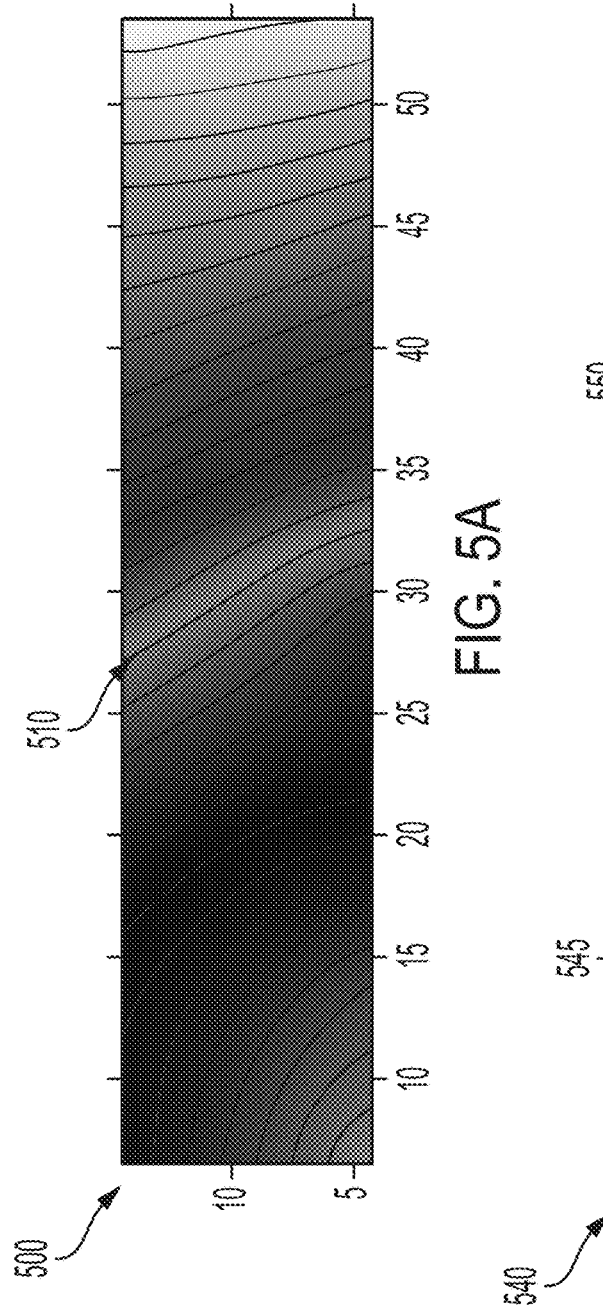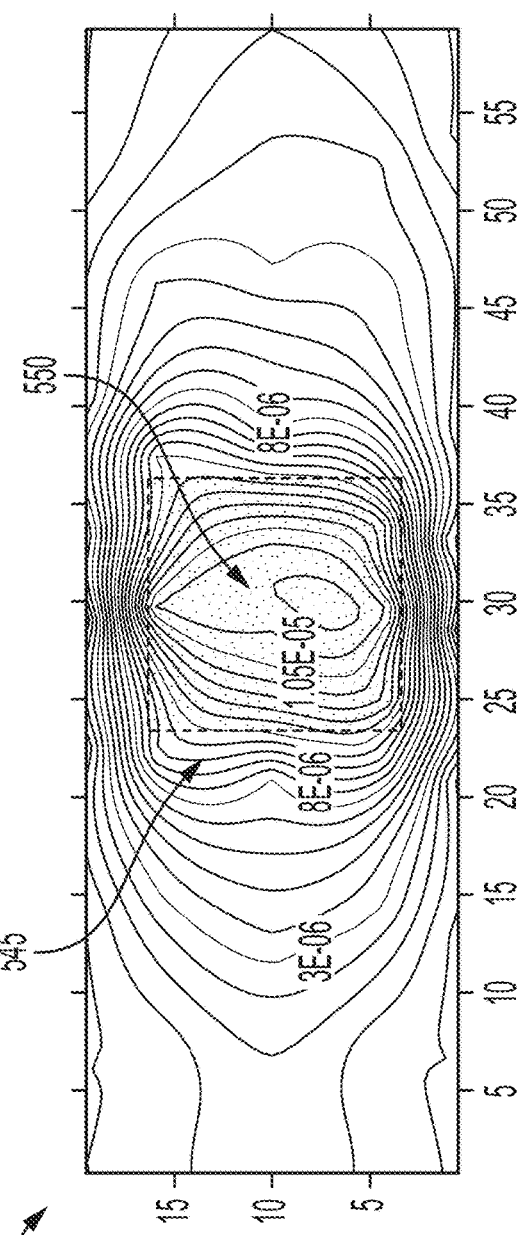
FIG. 5A
FIG. 5B

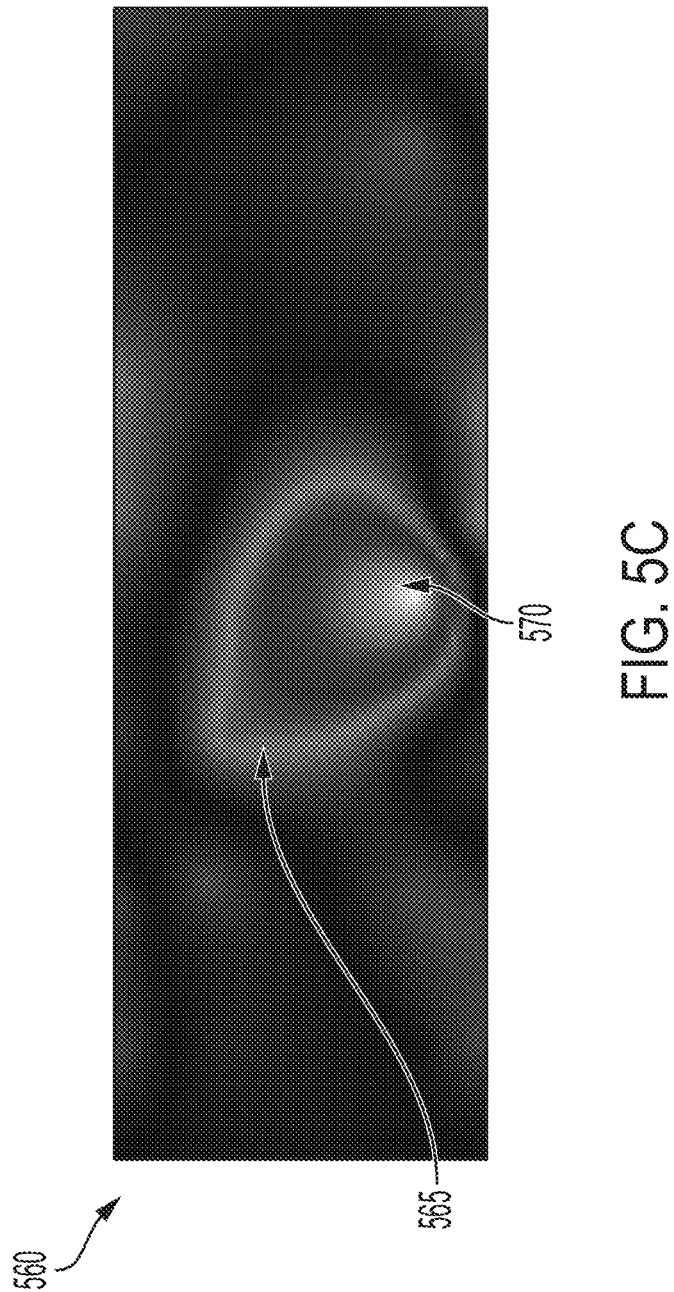

SYSTEM, APPARATUS, AND METHOD FOR STRUCTURAL FAULT DETECTION

CROSS-REFERENCE TO RELATED APPLICATIONS

This application is based upon and claims priority to U.S. provisional patent application 63/234,643 entitled "SYSTEM AND METHOD FOR CONDITION RATING OF CIVIL STRUCTURES" and filed on Aug. 18, 2021, the entire content of which is incorporated herein by reference.

BACKGROUND

1. Field

The present disclosure is directed to a system, apparatus, and method for structural evaluation. More specifically, the present disclosure is directed to a system, apparatus, and method for evaluating a condition of a civil structure via measurement and characterization of its vibrational response.

2. Description of the Related Art

Presently, there exists a need to reliably evaluate the condition of civil infrastructure such as bridge decks, highways, railways, tunnels, pressurized pipelines, edifices, and the like. Existing evaluation systems exhibit a variety of shortcomings; however, the reliable evaluation of the condition of civil infrastructure is important to reduce tragic, expensive, or ecologically hazardous infrastructure failures, as well as to provide quantitative data to evaluate changes to the infrastructure condition over time.

For example, bridges constitute a significant segment of the U.S. transportation infrastructure. Bridge decks are among the most vulnerable elements within the transportation infrastructure. In some instances, bridge decks exhibit a service life shorter than other bridge components. Out of more than 600,000 bridges in the United States, the number of concrete highway bridges with wearing surfaces is over 180,000. Inspection of bridge decks is performed periodically to check for efficient performance and safety. In support of these needs and requirements, the Federal Highway Administration (FHWA) initiated the Long-Term Bridge Performance (LTBP) program to utilize non-destructive evaluation (NDE) technologies for bridge deck condition assessment. This requires new evaluation systems, tools, and methods capable to enhance the efficiency and repeatability of field data collection.

However, extant NDE technologies exhibit a variety of limitations. For instance, U.S. Pat. No. 4,927,575 entitled "Half-cell potential (HCP) to assess corrosion activity" provides for the relatively time-consuming and labor-intensive manual collection of electrical resistivity data to assess potential corrosion. Such collected data is associated with corrosion, but may not be a direct measurement of corrosion, thus providing for interpretation challenges. For example, electrical resistivity is changed by environmental parameters other than corrosion (for example, moisture content, salt content, porosity, and the like). There are significant challenges in delineating the role of each parameter on the electrical resistivity. Furthermore, concrete elements or elements with electrically isolating coatings or overlays (for instance, asphalt overlays on bridge decks) do not provide meaningful data.

Another extant NDE technology involves using ultrasonic surface waves (USW) to assess concrete quality. While USW measurements are more suited for analysis of a condition of concrete structures than are electrical resistivity measurements, USW measurements are associated with other significant shortcomings. For instance, the use of USW measurement to evaluate concrete modulus often requires road or bridge closure. Such techniques are labor intensive and require special expertise and training to set up equipment, collect data, and interpret data. Moreover, certain concrete flaws, such as debonding or delamination require even greater expertise and the process of collecting data to detect various flaws is time intensive. Finally, layered systems such as decks with asphalt concrete overlays require yet even further complicated analyses.

Further efforts to provide NDE for bridge deck condition assessment involve ground penetrating radar (GPR). GPR facilitates a qualitative assessment of the deck condition, but also has significant limitations. Such techniques are labor intensive and require special expertise and training to collect data and interpret data. Moreover, GPR mechanisms mainly facilitate identification of corrosion in an upper portion of a bridge deck rather than both upper and lower portions of a bridge deck. Weather conditions, such as cold weather, harm the accuracy of collected data and deicing agents hamper signal penetration into the bridge deck. Moreover, GPR mechanisms fail to detect a variety of defects, such as many types of deck delaminations or defects obscured by a rebar mat.

Finally, impact echo (IE) technologies are implemented to detect delaminations. However, such techniques require closure of traffic lanes and a dense test grid, increasing the time required to perform testing. Moreover, in areas where an overlay of an overlaid bridge deck may be debonded, it is very difficult or impossible to assess the bridge deck condition. Geometrical and boundary effects, especially those associated with structural elements such as girders, piers, and pier caps complicate data analysis.

Further extant NDE technologies include that described in U.S. Pat. No. 10,521,098 entitled "Non-contacting monitoring for bridges and civil structures," U.S. Pat. No. 9,036,861 entitled "Method and system for remotely inspecting bridges and other structures," and U.S. Pat. No. 9,964,519 entitled "Non-destructive system and method for detecting structural defects." Each such technology exhibits a variety of limitations some of which are discussed above. In a practical application, many such technologies continue to demand presence of multiple inspectors to operate multiple different sensors, laborious field techniques and safety measures, and challenges addressing discrepancies among the different sensors.

SUMMARY

A system for remote vibration-based evaluation of a structure (such as civil infrastructure) is provided. The system may assess and/or monitor the condition through detection and analysis of characteristics of a vibrational response of the structure. The system may include a laser Doppler vibrometer. The laser Doppler vibrometer may be configured to project a plurality (an array) of laser beams onto the structure. The system may also include a sensor of backscattered light ("sensor" or "beam array backscatter sensor"). The sensor may be configured to receive a backscattered light of at least one laser beam of the plurality of laser beams that is backscattered from the structure. The sensor is further configured to generate a sensor data. In various embodiments the sensor is an aspect of the laser Doppler vibrometer.

The system further may include an accelerometer. The accelerometer is configured to detect a motion of a mobile sensing platform carrying the sensor (which may be an aspect of a laser Doppler vibrometer). The accelerometer is also configured to generate accelerometer data. The accelerometer data may be data on 3D acceleration of the sensing platform and its orientation during a measuring cycle. Each of the laser Doppler vibrometer, the sensor (which may be a component of the laser Doppler vibrometer) and the accelerometer is configured to connect to a transmitter. The transmitter transmits data corresponding to (i) the sensor data and (ii) the accelerometer data. Finally, at least one of (a) an amplitude, (b) a phase, and (c) a frequency of the backscattered light (associated with each laser beam of the plurality of laser beams), corresponds to a combination of the motion of the mobile sensing platform and a vibration of the structure. In various instances, the frequency of the phase of the backscattered light is a frequency change or a phase change relative to a frequency or a phase of a reference beam of a local oscillator. In various instances a frequency shift in each channel (laser beam) of the beam array (plurality of laser beams) might be different, so that the system may detect a spatial-temporal pattern of vibration, displacement, or velocity of the structure.

The system may have various other features or aspects. For instance, in various embodiments, the mobile sensing platform is an unmanned aerial vehicle. The structure may be a bridge, and vibration of the structure may be generated by vehicles passing across the bridge and not by a single-mode vibration source. The sensor may include multiple sensing elements and may detect the backscattered light from the plurality of laser beams of the beam array at a same time.

The system may include additional components connected to those described above. For instance, the system may include optics. The optics may be disposed between the laser Doppler vibrometer and the structure. The optics may include a zoom lens that is operable to change a spacing between laser beams of the plurality of laser beams.

In a further instance, the system may include a beam splitter. The beam splitter may have a first output positioned adjacent the sensor and a second output configured to be positioned adjacent an imaging camera. The system may include the aforementioned imaging camera. The transmitter may be additionally configured to transmit data corresponding to an image of the structure that is collected by the imaging camera during the collecting of the sensor data. In various instances, the image may correspond to an area of the structure onto which the plurality of laser beams is projected.

In a still further instance, the system may include a global positioning system (GPS) receiver. The GPS receiver may generate data corresponding to a location of the mobile sensing platform during the collecting of the sensor data. The transmitter may be further configured to transmit the location data. The location data may also be utilized by other aspects of the mobile sensing platform to cause the mobile sensing platform to navigate to a desired location.

In another example, the system further includes a remote processor configured to receive the sensor data and the accelerometer data from the transmitter. The remote processor is operable to use the accelerometer data to filter from the sensor data a vibration. The vibration that is being filtered is a vibration that is associated with the motion of the mobile sensing platform having the sensor and that is not associated with the vibration of the structure.

An unmanned aerial vehicle is provided. The unmanned aerial vehicle may be for sensing a motion of a structure. The sensing of the motion may facilitate evaluating a condition of a civil structure via measurement and characterization of its vibrational response. The vehicle may include a drone configured to fly above the structure. The vehicle may include a drone configured to fly beside or beneath the structure. The vehicle may also include a laser Doppler vibrometer. The laser Doppler vibrometer may be attached to the drone. The laser Doppler vibrometer may project a plurality of laser beams (a beam array) onto the structure. A sensor may also be attached to the drone. The sensor may be a component of the laser Doppler vibrometer. In some instances, the sensor is a component that is separate from the laser Doppler vibrometer. The sensor may detect backscattered light from the plurality of the laser beams as the plurality of the laser beams backscatter from the structure. The sensor may generate sensor data corresponding to the detected backscattered light. An accelerometer may also be attached to the drone. The accelerometer may measure acceleration of the drone and generate accelerometer data corresponding to the acceleration of the drone. The acceleration of the drone may correspond to a motion of the drone. The motion of the drone may have a frequency or a frequency band that can be measured. A transmitter may also be provided. The transmitter may receive data corresponding to the sensor data and the accelerometer data and may transmit the data to a processor.

The unmanned aerial vehicle and related aspects may include further features. For instance, the processor may be a remote processor disposed remotely from the unmanned aerial vehicle. The processor may receive the data corresponding to the sensor data and the accelerometer data from the transmitter and may use the accelerometer data to filter from the sensor data the acceleration of the drone that is not associated with the motion of the structure.

An imaging camera may be included with the unmanned aerial vehicle. The imaging camera may capture an image of an area of the structure onto which the plurality of laser beams is projected. A beam splitter may be provided as well. The beam splitter may connect to the imaging camera and to the sensor. The beam splitter may match an imaged area of an inspection viewed by the imaging camera and an areal spread of the plurality of laser beams on the structure under evaluation.

Optics may be provided on the unmanned aerial vehicle. For instance, optics may be attached to the drone in a position disposed between the laser Doppler vibrometer and the structure. The optics may include a zoom lens. The zoom lens operates to change a spacing between the laser beams of the plurality of laser beams projected onto the structure.

A global positioning system (GPS) receiver may be included on the unmanned aerial vehicle. The transmitter may receive data from the GPS receiver corresponding to a location of the drone during the generating of the sensor data. The transmitter may transmit the data corresponding to the location of the drone to the processor.

A method of measuring a vibration of a structure is also contemplated. The method of measuring the vibration may measure a vibration in a multiplicity of locations (i.e., a spatial pattern of the vibration). The method may include various aspects. For instance, the method may include projecting, by a laser Doppler vibrometer, a plurality of laser beams (a beam array) onto the structure. The method may include receiving, by a sensor, a backscattered light of at least one laser beam of the plurality of laser beams that is backscattered from the structure and generating a sensor data. The method may further include detecting, by an accelerometer, a motion of a mobile sensing platform carrying the sensor and generating accelerometer data. Moreover, the method may include transmitting, by a transmitter connected to the laser Doppler vibrometer, the sensor, and the accelerometer, data corresponding to (i) the sensor data and (ii) the accelerometer data, for receipt by a remote processor. In various instances, the sensor data corresponds to backscattered light of multiple laser beams of the plurality of laser beams collected simultaneously. In various instances, the sensor is a part of the laser Doppler vibrometer.

The method may include additional aspects. For instance, the method may include calculating, by the remote processor, at least one of a Fourier component of the frequency band and amplitude of the displacement and/or velocity of vibration of the structure from the data corresponding to the sensor data and the accelerometer data. An exceeding by the frequency and the amplitude of the vibration beyond a threshold amplitude at a threshold frequency corresponds to a presence of a mechanical defect in the structure. The method may include calculating, by the remote processor, at least one of a frequency and an amplitude of the motion of the structure from the data corresponding to the sensor data and the accelerometer data, wherein an exceeding by the frequency and the amplitude of the motion beyond a threshold amplitude at a threshold frequency corresponds to a presence of a mechanical defect in the structure. A displaying aspect may be included as well. The method may include displaying on a graphical user interface a mapping of the frequency and the amplitude of the vibration at different locations on a surface of the structure. The method may include displaying on a graphical user interface a mapping of a displacement of a surface of the structure at different locations on the surface of the structure.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIG. 4 illustrates an example graph illustrating a Fourier spectrum of vibration frequencies associated with a structure, in accordance with various embodiments;

FIG. 5A depicts a magnitude of displacement of a surface and not having defects, thus not exhibiting local discontinuities, in accordance with various embodiments;

FIG. 5B depicts a magnitude of displacement of a surface with a defect near a central area of the figure, in accordance with various embodiments;

FIG. 5C depicts a different representation of the surface according to FIG. 5B, in accordance with various embodiments;

DETAILED DESCRIPTION

Figure 1:
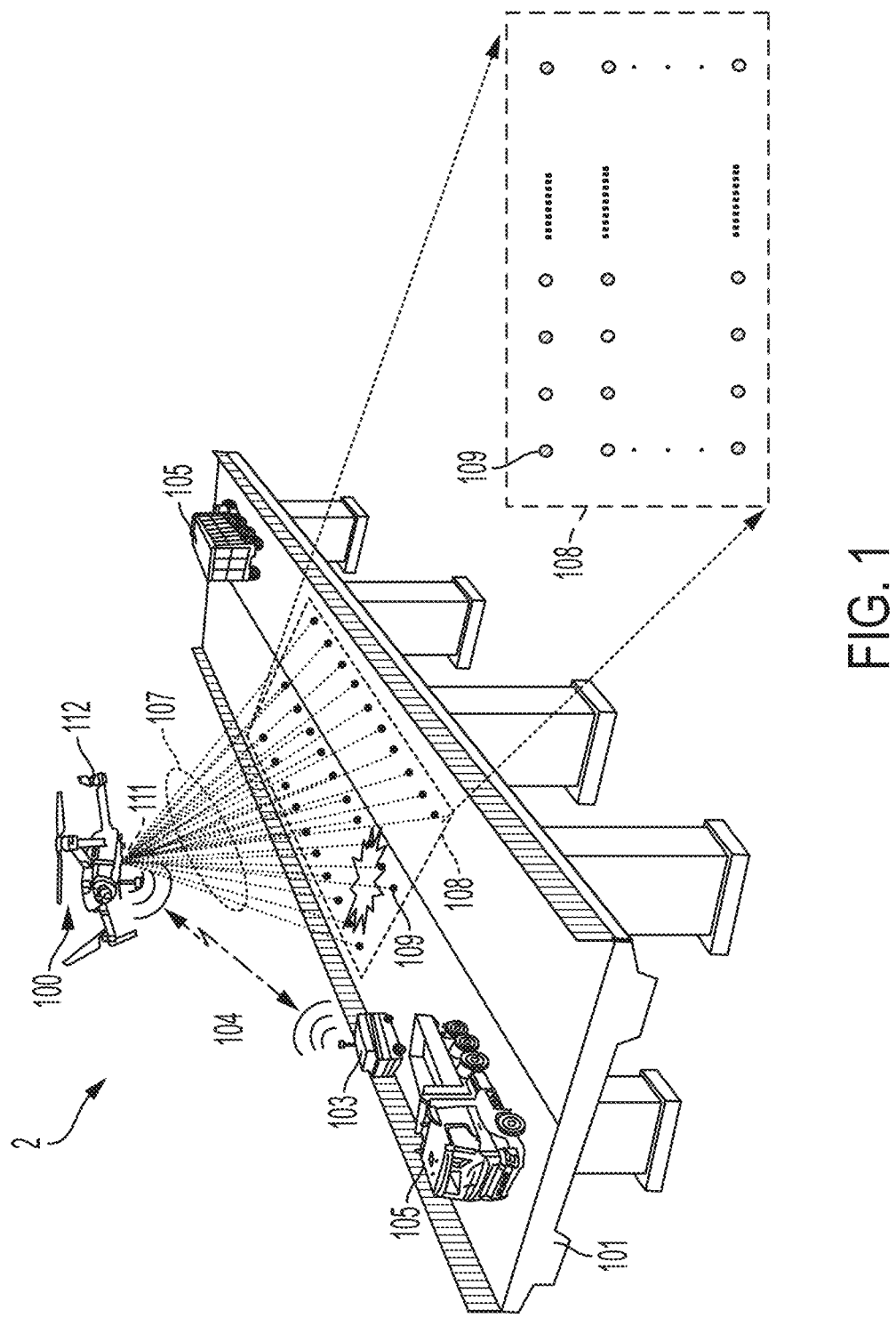
FIG. 1 illustrates an example system for remote vibration-based evaluation of a structure, in accordance with various embodiments.

As disclosed herein, systems, apparatuses, and methods are provided to facilitate characterization of infrastructure condition. In various embodiments, sensors may be disposed in a non-contacting relationship to a structure and the sensors may collect data associated with a condition of the structure. For instance, an airborne platform, such as an unmanned aerial vehicle (UAV) or a manned vehicle may be flown to position sensors relative to a structure for conducting of a remote vibration-based evaluation of the structure. While prior efforts to implement airborne platforms to position cameras are potentially hampered by lighting and environmental conditions, as well as the limitations of cameras to detect conditions that are obscured by obstructions, the systems, apparatuses, and methods provided herein are configured to overcome such challenges.

In various embodiments, laser Doppler vibrometery (LDV) techniques may facilitate the characterization of structures. Typically, physical structures will vibrate in response to mechanical excitation. Moreover, such physical structures often exhibit complex, random, or nondeterministic vibrations. Such complex, random, or nondeterministic vibrations impede efforts to implement LDV to measure transverse displacement of a structure.

In various embodiments, LDV techniques may be implemented to characterize a vibratory response of a structure at multiple points. Such characterizations include the determination of natural frequency and mode shapes. For instance, a change in detected resonances or deflective shapes may indicate a change in structure condition. Such a change may be associated with defects in the structure.

Moreover, such analysis may be performed while the structure is in active use. For instance, a bridge may remain open to the public and traffic may be traveling on the bridge during such characterization. Moreover, such traffic may provide the mechanical excitation generating the vibratory response, facilitating testing without contact or physical communication between structure and a sensor. While reference will be made to a bridge throughout this document, other structures may be characterized without application of a separate excitation source, but rather in connection with mechanical excitation provided by traffic and the like. For instance, highways, railways, tunnels, viaducts, may be characterized without separate excitation being applied, and the excitation may arise from traffic.

In further instances, an excitation impulse may be applied to a structure under evaluation (e.g., a structure being evaluated, inspected, or monitored). For instance, a pipeline, storage tank, or the like may be characterized in connection with an excitation impulse applied by an impactor. As such, the impulse may be a mechanical impact. Thus, while, the systems, methods, and apparatuses discussed herein are mentioned with respect to a bridge, such reference is an example of one of many use cases and is non-limiting. Further implementations may include characterization of other structures.

Yet furthermore, the systems, apparatuses, and methods herein provide for accurate and precise detection of changes in structure condition by enabling characterization of a vibratory response of a structure at multiple points across the structure in simultaneity or near simultaneity. By characterizing the vibratory response of the structure at multiple points across the structure in simultaneity or near simultaneity, this disclosure overcomes challenges associated with complex, random, or nondeterministic vibration.

Moreover, this disclosure enables cancelation and/or filtering of the errors arising from movement of a sensor platform. Implementation of a mobile sensor platform provides for rapid characterization of multiple areas of a structure or multiple structures, but also introduces movement, such as vibration, which may contribute to errors in a characterization of a vibratory response of a structure. As such, sensor platforms such as airborne and other mobile platforms are contemplated in connection with aspects configured to detect and/or filter the influence of vibration and movement of the sensor platform.

With reference to FIG. 1, a system 2 for detecting motion (such as vibration or other motion) of a structure is provided. The detected vibration of the structure may be processed in order to characterize a condition of the structure. FIG. 1 also depicts structure under evaluation 101, which is the structure being characterized. While shown as a bridge, the structure under evaluation 101 may be a highway, railway, tunnel, viaduct, pipeline, storage tank, or any other structure for which a condition is desired to be characterized. In various instances, as used herein, characterizing the condition of the structure may mean determining a presence and/or a severity of a defect in the structural integrity of the structure. A defect may be an area of structural weakness, decay, or other undesired mechanical property.

FIG. 1 also depicts at least one mechanical exciter 105. Mechanical exciters are shown as vehicles driving on the structure under evaluation 101 and not as a single-mode vibration source. However, one may appreciate that the mechanical exciter 105 may be an impactor or single-mode vibration source, or other apparatus to impart an impulse or other mechanical energy or vibration to the structure under evaluation 101.

The system 2 may have two general aspects. One aspect may be a mobile sensing platform 100. The mobile sensing platform 100 contains sensors that characterize the structure under evaluation 101. Another aspect may be a ground station 103. The ground station 103 is in operative electronic communication via a communication link 104 with the mobile sensing platform 100 and provides instructions to the mobile sensing platform 100 and receives data from the mobile sensing platform 100 corresponding to measurements made by the sensors of the mobile sensing platform 100 to characterize the structure under evaluation 101.

In various embodiments, the mobile sensing platform 100 includes a vehicle 112 and a mobile opto-electronics package 111. The vehicle 112 may be an unmanned aerial vehicle (UAV) or "drone." The vehicle 112 may be a manned aerial vehicle, such as an airplane or a helicopter. The vehicle 112 may further be a land vehicle or a boat or other water vehicle, as desired. As depicted in the example embodiment of FIG. 1, the vehicle 112 is a drone.

The mobile opto-electronics package 111 may be a coherent radiation source (e.g., laser), a collection of sensors, processors, and other aspects configured to collect data associated with the condition of the structure under evaluation 101. This data may be processed to characterize the structure under evaluation 101. For example, the mobile opto-electronics package 111 may generate a plurality of laser beams (beam array 107 of laser beams 109) that illuminate an inspection area 108 of the structure under evaluation 101 while the vehicle 112 positions the mobile opto-electronics package 111 in a desired position relative to the structure under evaluation 101.

For example, the drone (vehicle 112) may fly over a bridge and the mobile opto-electronics package 111 onboard the drone may shine an array of laser beams 109 onto the bridge. The mobile opto-electronics package 111 may also have a multi-channel sensor that detects light backscattered from one or more laser beams 109 that illuminate the structure under evaluation and by detecting changes in characteristics of the backscattered light, such as a phase, a complex amplitude or frequency, detects a motion of the structure under evaluation 101. Such movement may include vibrations.

FIG. 1 depicts an example m×n beam array 107 that illuminates the inspection area 108 with the plurality of laser beams 109 concurrently. Each laser beam 109 of the plurality of laser beams (beam array 107) generates a laser spot within the inspection area 108. The laser spots of the plurality of laser beams (beam array 107) backscatter light from the laser spots in the inspection area 108. This backscattered light holds information on a temporal dynamic of vibrational spectra, a localized velocity and/or displacement associated with a particular position on the inspection area 108 of the structure under evaluation 101. This temporal dynamic of vibrational spectra, the localized velocity and/or displacement associated with the particular position (or that associated with a plurality of particular positions), regardless of whether characteristically oscillatory, or not characteristically oscillatory, may be referred to as "vibration" herein for brevity.

In various instances where the structure under evaluation 101 is a bridge, the mobile opto-electronics package 111 detects a vibrational response of a bridge deck. More specifically, the mobile opto-electronics package 111 detects vibrational characteristics including (i) a frequency spectra f of the vibration of the bridge deck and/or (ii) a time evolution of a normal component of a localized displacement and/or a velocity of the bridge body. These two parameters can be detected with their values measured by using a laser Doppler vibrometer directed toward a zone of the interest of the structure. However, owing to a non-stationary and transient nature of the vibrational process, such characterization requires measurements to be taken simultaneously at multiple spots of the structure. In further embodiments, the characterization involves sequentially obtained measurements at multiple spots of the structure but with a sequential scan time that is significantly shorter than a transient vibration time, such that the measurements are in relative simultaneity relative to the period of the vibration being detected.

Figure 2:
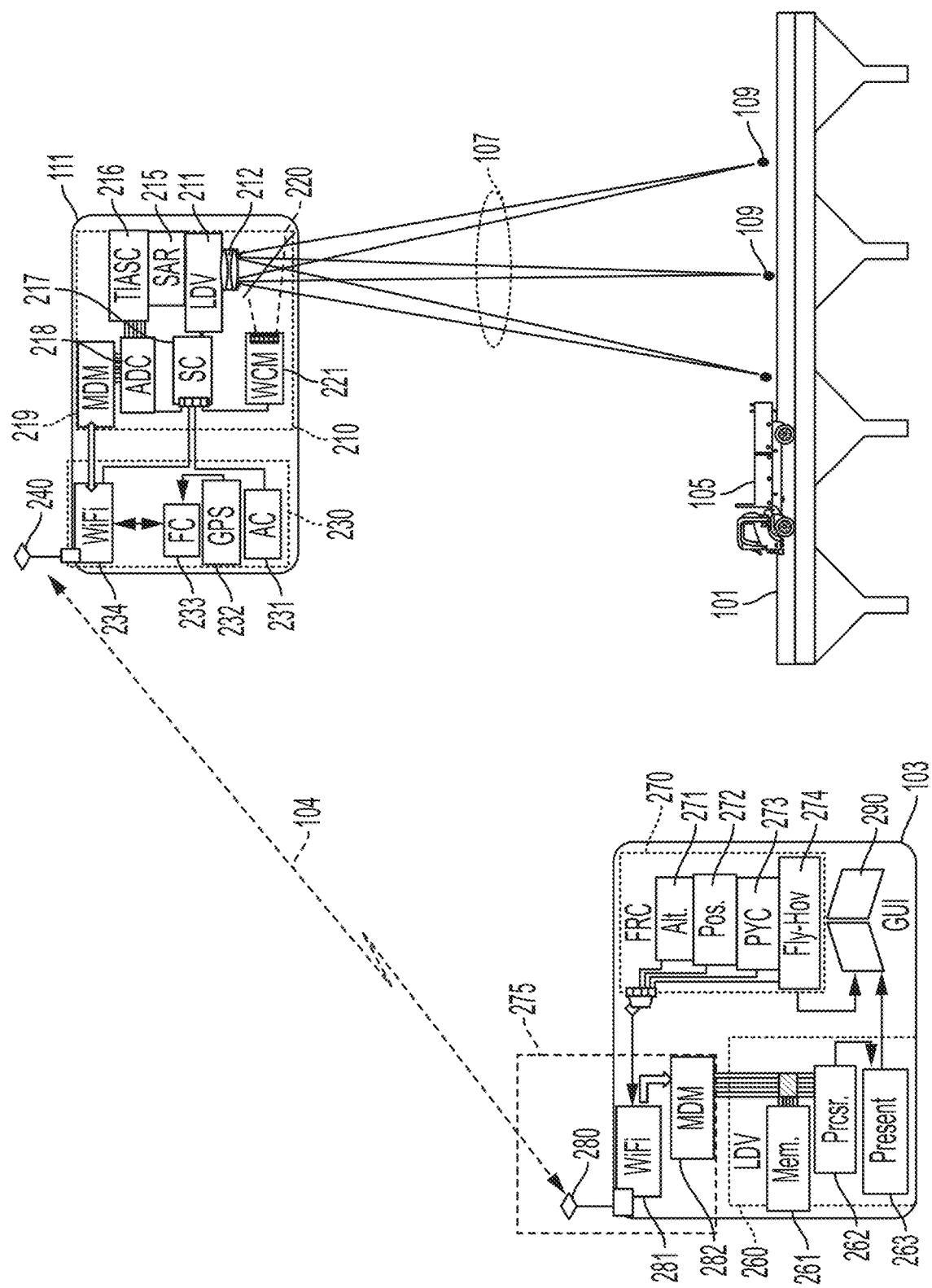
FIG. 2 illustrates aspects of the example system, and more specifically, components of a mobile sensing platform and a ground station in operative communication, in accordance with various embodiments.

With ongoing reference to FIG. 1, but additional reference to FIG. 2, specific aspects of the system 2 are provided in greater detail. For instance, the mobile opto-electronics package 111 of the mobile sensing platform 100 may include two aspects. The mobile opto-electronics package 111 may include a navigation platform 230 and a detection platform 210. The navigation platform 230 is configured to facilitate the positioning of the vehicle 112 so that the mobile opto-electronics package 111 (and specifically, one or more sensor) is disposed in a desired position relative to the structure under evaluation 101. The detection platform 210 generates the plurality of laser beams (beam array 107 of laser beams 109) and also detects the backscattered light from the laser beams 109 in order to evaluate the localized velocity and displacement associated with the particular positions on the inspection area 108 of the structure under evaluation 101. Notably (and as will be described further herein) various optical components, parts, or modules are included in the detection platform 210 to facilitate generation of the plurality of laser beams (beam array 107 of laser beams 109) wherein the laser beams 109 have different spacing. In this manner, the plurality of laser beams (beam array 107 of laser beams 109) may be adjusted to facilitate precise and accurate measurements for different structures under evaluation 101 and depending on the distance between the structure under evaluation 101 and the mobile sensing platform 100.

Turning attention in greater detail to the detection platform 210, the detection platform 210 comprises a laser Doppler vibrometer 211 (LDV 211). The LDV 211 generates the beam array 107 of laser beams 109. The beam array 107 may be termed a "plurality of beams" or a "plurality of laser beams" elsewhere herein. The laser beams 109 may be of various wavelengths. For instance, the LDV 211 may generate visible light laser beams, or non-visible light laser beams, or other beams as desired. The LDV 211 may be in optical communication with optics 212.

The optics 212 may comprise one or more lens, mirror, polarizer, beam splitter, beam combiner, and/or other optical component configured to control an areal spread of the laser beams 109 in the beam array 107 (plurality of beams). The optics control the areal spread of the laser beams 109 on the inspection area 108. In this manner, the beam array 107 may be operatively configured for measurement of different structures under evaluation 101. The optics 212 may adjust, for instance, having an adjustable zoom, to change the spacing of the laser beams 109 of the beam array 107.

The detection platform 210 may include a beam splitter 220. The beam splitter 220 comprises an optical device in the path of at least a portion of the light backscattered from each laser beam 109 that illuminates the inspection area 108. The beam splitter 220 may facilitate multiple devices viewing the backscattered light. For instance, the beam splitter 220 may permit the sensor 215 to view the backscattered light, as well as an imaging camera 221.

The sensor 215 may comprise multiple sensor elements. In various embodiments, the sensor 215 comprises a plurality of sensor elements corresponding in number to the number of optical spots (laser spots) projected by the beam array 107, and thus the number of laser beams 109 of the beam array 107. The sensor 215 may detect backscattered light backscattered from each laser beam 109 that illuminates the inspection area 108. Because, each laser beam 109 of the beam array 107 backscatters light that holds information on the temporal dynamic of the localized velocity and displacement associated with a particular position on the inspection area 108, measurement by the sensor 215 of attributes of each light spot associated with each laser beam 109 accomplishes simultaneous or near simultaneous characterization of the vibration of the structure under evaluation 101. The sensor 215 generates sensor data in response to the measurement of the backscattered light. In various embodiments, the sensor data is an analog signal.

The detection platform 210 comprises a signal conditioner 216. The signal conditioner 216 receives the data (sensor data) from the sensor 215 and generates one or more conditioned electronic signal. In various embodiments, the signal conditioner 216 comprises a transimpedance amplifier and signal conditioner (TIASC), though any signal conditioner 216 configured to condition the signal for further circuit components may be contemplated. For example, the signal conditioner 216 may match impedances, adjust amplitudes, add or remove DC offsets and/or the like.

The detection platform 210 may comprise an analog to digital converter (ADC) 218. The ADC 218 may receive the conditioned electronic signal and generate digital sensor data which corresponds to the conditioned electronic signal. For instance, the ADC 218 may generate bytes of data having values corresponding to an amplitude of the conditioned electronic signal. In further embodiments, ADC 218 may determine additional information about the conditioned electronic signal, such as data associated with a frequency, waveform shape, duty cycle, periodicity, or changes therein. The ADC 218 may output the digital sensor data to other aspects of the detection platform 210.

The detection platform 210 may include a multiplexer/demultiplexer module 219 (MDM module 219). The MDM module 219 may be envisioned as a traditional signal multiplexer, although in various embodiments, the MDM module 219 comprises a processor configured to generate discrete or continuous/complex data and/or data packets or combinations thereof. The MDM module 219 may combine data from multiple sources or may combine data received in a stream into periodic groupings, and the like. The MDM module 219 may format the digital sensor data and provide formatted digital sensor data to a transceiver 234 for transmitting to the ground station 103. In various instances, the MDM module 219 provides the formatted digital sensor data to the transceiver 234. Thus, while it may be said that the sensor 215 provides sensor data to the transceiver 234 (or provides data corresponding to the sensor data), a person may appreciate that this data may be variously processed and manipulated by different electronic components between the sensor 215 and the transceiver 234. In some instances, this transceiver is a portion of the navigation platform 230. Thus, one may appreciate that the navigation platform 230 and the detection platform 210 of the mobile opto-electronics package 111 may share components.

The detection platform 210 may include the imaging camera 221 briefly mentioned above during discussion of the beam splitter 220. The imaging camera 221 may be a visible light camera. The imaging camera 221 may be an infrared camera, or an ultraviolet camera, or any camera as desired. The imaging camera 221 may be oriented to capture images of inspection area 108. The imaging camera 221 may be oriented to capture images of the beam array 107 of laser beams 109. Thus, the imaging camera 221 may have a field of view corresponding (e.g., matching) to that of the sensor 215. The imaging camera 221 captures an image of the beam array 107 of laser beams 109 spread across the inspection area 108 of a structure under evaluation 101. This corresponding image may be synchronized with data from the navigation platform 230 (for instance, a navigation data receiver 232 providing location data or time data) so that the inspection area 108 is properly mapped in relation to the structure under evaluation 101 and similarly, so that data from the sensor 215 is properly mapped in relation to the inspection area 108 and synchronized in relation to data from other sensors (for example, accelerometer 231, discussed further herein).

Finally, the detection platform 210 may include a system controller 217. The system controller 217 comprises a processor configured to provide instructions to and receive data from aspects of the mobile opto-electronics package 111. For instance, the system controller 217 may control operation of one or more of the sensor 215, the signal conditioner 216, the ADC 218, the MDM module 219, the laser Doppler vibrometer 211, the optics 212, the beam splitter 220, the imaging camera 221, and importantly, elements of the navigation platform 230 which may facilitate improved accuracy and precision of defect detection in the inspection area 108 of the structure under evaluation 101.

Having introduced each aspect of the detection platform 210, attention is now directed to specific components of the navigation platform 230. These aspects are logically depicted as elements of the navigation platform 230, though in some embodiments, these aspects may be integrated into the detection platform 210 or may be shared by both the navigation platform 230 and detection platform 210.

The navigation platform 230 may include a navigation data receiver 232. The navigation data receiver 232 may include a global positioning system (GPS) receiver. The navigation data receiver 232 may be a wide area augmentation system (WAAS) GPS receiver. Moreover, the navigation data receiver 232 may include an automatic dependent surveillance-broadcast (ADS-B) receiver. The navigation data receiver 232 produces location data corresponding to a physical location of the detection platform 210. This location data may be mapped to the inspection area 108 and/or structure under evaluation 101. In this manner, the data generated by the detection platform 210, such as the formatted digital sensor data, may be electronically tagged with a geospatial location. The navigation data receiver 232 may also provide a timing source for synchronizing data from different sensors in the time-domain so that the different data maintains a contemporaneous relationship.

The navigation platform 230 may include an accelerometer 231. In further instances, an accelerometer 231 is a portion of the detection platform 210, but for convenience, is shown in the navigation platform 230 in the associated figures. The accelerometer 231 detects acceleration of the mobile sensing platform 100. For instance, the accelerometer 231 detects vibration and movement of the mobile sensing platform 100 and generates platform acceleration data corresponding to the acceleration of the mobile sensing platform 100. For instance, the mobile sensing platform 100 may be a drone subject to vibrations.

This platform acceleration data may be mapped to the formatted digital sensor data in time-relation, or may be processed in connection with the sensor data at other points in a signal chain, so that effects of acceleration of the mobile sensing platform 100 on the detected vibration of the structure under evaluation 101 may be ameliorated. Stated differently, the system 2 may combine both platform acceleration data with data corresponding to the vibration of the structure under evaluation 101 to cancel out vibrations that are actually resultant from the mobile nature of the mobile sensing platform 100 rather than actual vibrations of the structure under evaluation 101. In this manner, the accuracy and precision of defect detection may be enhanced, but without necessitating use of a stationary sensing platform. By allowing the platform to be mobile in nature, large structures under evaluation 101 may be evaluated, and multiple different structures under evaluation 101 at different locations may be evaluated rapidly and/or with minimal set up time for the system 2.

The navigation platform 230 may include a flight controller 233. The flight controller 233 is configured to cause the mobile sensing platform 100 to fly to a desired position relative to the structure under evaluation 101 and to move about as desired to effectively translate to the inspection area 108 of the structure under evaluation 101 so that the beam array 107 of laser beams 109 is directed at an intended area. In various instances, the flight controller 233 is an autonomous flight controller. In further instances, the flight controller 233 operates in response to instructions received via a communication link 104 from a ground station 103. Moreover, the flight controller 233 may operate in a combination of autonomous mode and in response to instructions.

The navigation platform 230 may include the transceiver 234. The transceiver 234 may include a transmitter and a receiver. In various instances, the transceiver 234 comprises a Wi-Fi transceiver. The transceiver 234 may receive the formatted digital sensor data from the detection platform 210 and transmit it via an antenna 240 to the digital ground station. The transceiver 234 may also receive data from other system components, such as the flight controller 233, navigation data receiver 232, and the like. The transceiver 234 may receive data from a ground station 103, such as commands, and provide the data to the flight controller 233 or the system controller 217 for further dissemination, or directly to the various components discussed herein.

Having discussed each aspect of the mobile sensing platform 100 of the system 2, attention is now directed to the ground station 103 that communicates with the mobile sensing platform 100. The ground station 103 may include aspects to generate flight control instructions for controlling a flight of the mobile sensing platform 100. The ground station 103 may also include aspects to analyze and present structure condition data corresponding to a condition of the structure under evaluation 101. Finally, the ground station 103 may also include aspects to communicate data to and from the mobile sensing platform 100. Thus, the ground station 103 may include a flight remote controller 270 (FRC 270) to generate flight control instructions, a laser Doppler vibrometry controller unit 260 (LDV controller unit 260) to analyze and present data to define conditions of a structure under evaluation, and a communication module 275 to transfer data.

The LDV controller unit 260 comprises a processor 262 to receive the formatted digital sensor data transmitted by the mobile sensing platform 100 to the communication module 275 of the ground station 103. The processor 262 structures and arranges this data consistent with a graphical user interface 290 so that it is human readable. The processor 262 communicates the structured data to a data presenter 263. The data presenter 263 may comprise an optical output such as a screen device, or an aural output, such as a tone generating device, or the like. The processor 262 may interoperate with a memory 261 to store the data for manipulation or delayed presentation.

The flight remote controller 270 (FRC 270) may comprise a variety of different control engines. While logically depicted as separate units in the figures, one may appreciate that the control engines may be operative aspects of a controller and not separate components. For instance, the FRC 270 may have an altitude controller 271, a position controller 272, a pitch/yaw controller 273, and a fly/hover controller 274. These different controllers operate to control the altitude, position, pitch, and yaw of the mobile sensing platform 100 and whether the mobile sensing platform 100 is flying or hovering, respectively. In this manner, the FRC 270 may position the mobile sensing platform 100 in a desired position relative to the structure under evaluation 101.

The communication module 275 may include a multiplexer/demultiplexer module (MDM module) 282. The MDM module 282 may be envisioned as a traditional signal multiplexer, although in various embodiments, the MDM module 282 comprises a processor configured to generate complex data bytes, data words, and/or data packets or combinations thereof. The MDM module 219 may combine data from multiple sources or may combine data received in a stream into periodic groupings, and the like. The MDM module 282 may facilitate communication of both the FRC 270 and the LDV controller unit 260 with the mobile opto-electronics package 111 of the mobile sensing platform 100 via a shared transceiver.

Finally, the communication module 275 comprises a transceiver 281 in communication with an antenna 280. In various instances, the transceiver 281 comprises a Wi-Fi transceiver. The transceiver 281 may receive data from the mobile sensing platform 100 that corresponds to the sensor data and the accelerometer data corresponding to the detected backscattered light and the acceleration of the mobile sensing platform 100 (e.g., vibration of the drone), respectively. The transceiver 281 may transmit data from the ground station 103, such as data from the FRC 270, to direct the mobile sensing platform 100 to fly to a desired position relative to the structure under evaluation 101. The transceiver 281 forms the opposite end of the communication link 104 with the corresponding transceiver 234 on the mobile sensing platform 100.

Having discussed each aspect of the system 2, attention is now directed to a discussion of methods of defect detection by a system 2 evaluating a structure under evaluation 101. For example, in one scenario with a structure under evaluation 101 comprising a bridge, a vibration response of the bridge for a $1^{st}$ bending mode is between $f_1 \approx 4$ to 6 Hz. Such a vibration response means that less than 0.25 sec is needed for data capture. A vibration response of the bridge for a $3^{rd}$ torsional vibration mode is approximately $f_3 \approx 30$ Hz. Such a vibration response means that less than 0.03 sec is needed for data capture. However, when a defect in the structure under evaluation 101 is a local crack or delamination of the bridge deck top layer from its base, the vibrational frequencies of the bridge deck top layer tend to increase. Thus, detection of an excessively high vibrational frequency can indicate a defect has been detected. To detect these higher vibrational frequencies, a more rapid sampling rate is needed. For instance, when a defect in the structure under evaluation is a local crack or delamination of the bridge deck top layer from its base, the vibrational frequency can reach 300 Hz and higher, thus requiring the detection speed of the range of $3 \times 10^{-3}$ sec and less.

A method of performing such defect detection proceeds generally with positioning of the mobile sensing platform 100 above an inspection area 108, waiting for a vehicle (mechanical exciter 105) to pass by, then after the vehicle (mechanical exciter 105) passes and initiates the vibrational response of the bridge, projecting a beam array 107 of laser beams 109 onto the inspection area 108 and capturing by the sensor 215, backscattered light. This backscattered light varies in correspondence to the vibration of the bridge deck and facilitates identification of areas where the vibrational frequency is outside a upper or lower frequency threshold, or where a temporal displacement is outside an upper or lower threshold, or some other characteristic of the vibratory response of the bridge deck exceeds a target range, thus indicating presence of a defect.

Figure 3:
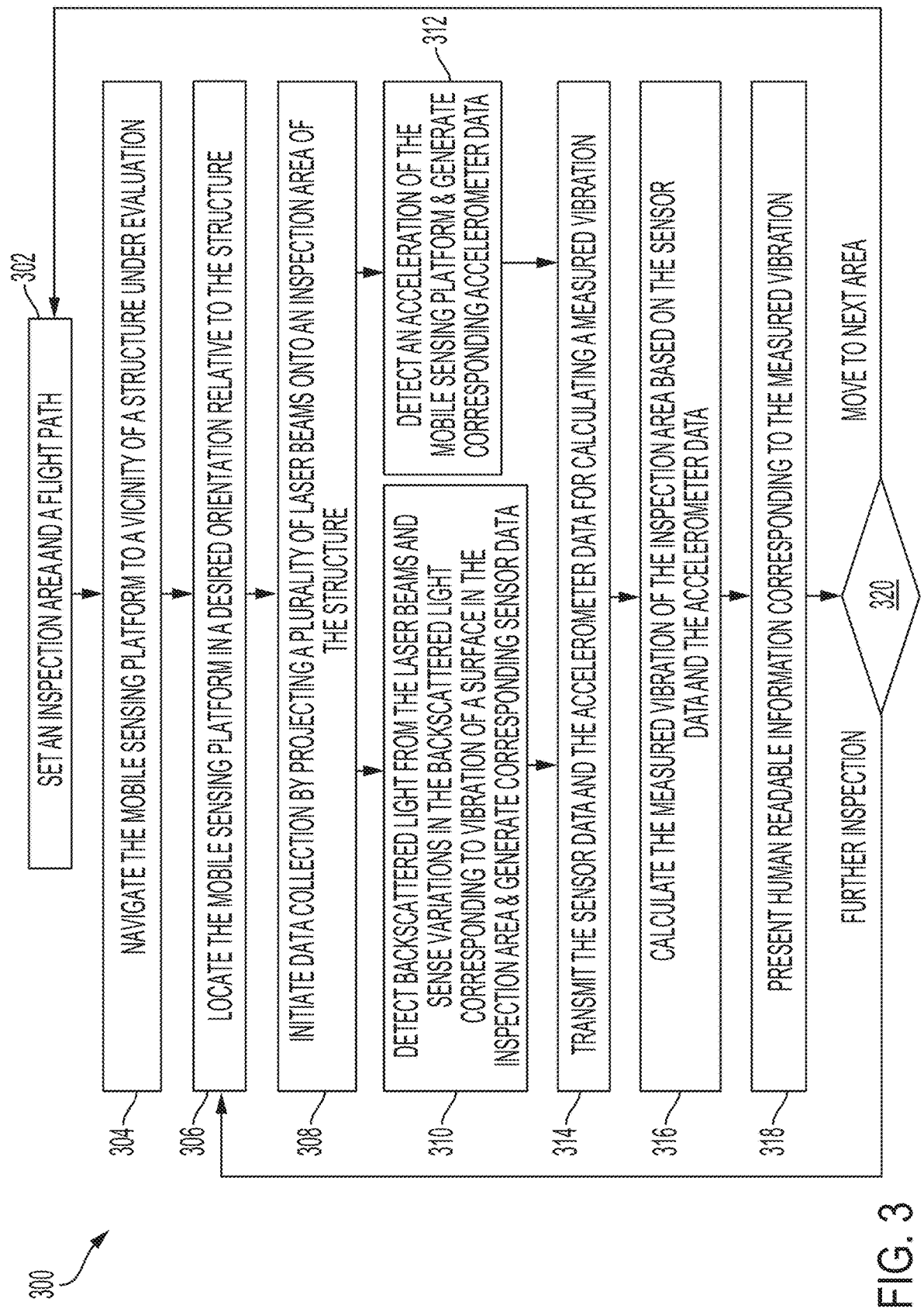
FIG. 3 illustrates a method of remote vibration-based evaluation of a structure, in accordance with various embodiments.

A more specific method of performing defect detection is reflected in FIG. 3. With reference to FIG. 3, a method 300 may include setting an inspection area 108 and a flight path (block 302). For example, a flight path of a mobile sensing platform 100 to a structure under evaluation 101 may have various limitations or obstacles. Moreover, a structure under evaluation 101 may have certain areas that need inspection, and other areas that do not need inspection. Thus, the inspection area 108 of the structure under evaluation 101 and a flight path to the structure under evaluation 101 is set by an operator of the ground station 103 or by an automated process and transmitted over a communication link 104 to a mobile sensing platform 100.

The navigation platform 230 of the mobile sensing platform 100 receives this transmitted data via communication link 104 and the mobile sensing platform 100 navigates to position the mobile sensing platform 100 in the vicinity of the structure under evaluation 101 (block 304).

The mobile sensing platform 100 utilizes the navigation platform 230 and the detection platform 210 to locate the mobile sensing platform 100 in a desired position relative to the structure under evaluation 101 (block 306). A desired position means that the beam array 107 directs laser beams 109 onto the inspection area 108 and that the spacing between the inspection area 108 and the mobile sensing platform 100 as well as the intensity of the laser beams 109 is adequate to allow the sensor 215 to acquire accurate and precise data. In various embodiments, the imaging camera 221 transmits image data to facilitate an operator and/or automated process to determine when the desired position is achieved.

Upon achievement of a desired position, the mobile sensing platform 100 initiates data collection (block 308). More specifically, the laser Doppler vibrometer 211 projects a beam array 107 of laser beams 109 onto the structure under evaluation 101 (e.g., a vibrating structure). For instance, the laser Doppler vibrometer 211 transmits a beam array 107 of laser beams 109 through optics 212 adjusted to project a m×n array of laser beams 109 onto the inspection area 108.

The sensor 215 detects backscattered light from the laser beams 109 and senses variations in this backscattered light. In various embodiments, these variations correspond to vibration of a surface in the inspection area 108. Consequently, the sensor 215 receives a backscattered light of at least one laser beam 109 of the beam array 107 of laser beams 109 that is backscattered from the structure (structure under evaluation 101) and generates a sensor data. The sensor data generated by the sensor 215 and associated electronics described herein represents the variations in the backscattered light. This data may be stored (block 310).

The accelerometer 231 of the navigation platform 230 may also detect a motion of a mobile sensing platform 100 carrying the sensor 215 and may generate accelerometer data that represents the acceleration of the mobile sensing platform 100. This data may also be stored. In various instances, the navigation data receiver 232 also generates data representing the location of the mobile sensing platform 100. This data may also be stored. This acquisition and storage of data by various sensors continues for a first duration corresponding to a period sufficient to accurately and precisely characterize the surface(s) in the inspection area 108 (e.g., the structure) (block 312).

This data is transmitted via the communication link 104 to the ground station 103 (block 314). More specifically, a transceiver 234 connected to the laser Doppler vibrometer 211, the sensor, and the accelerometer 231 transmits data corresponding to (i) the sensor data and (ii) the accelerometer data.

This data is processed at the ground station 103 or other location, for instance, a cloud computing resource. This data is processed to calculate a measured vibration of the structure from the data corresponding to the sensor data and the accelerometer data consistent with the processing methods described herein (block 316). The calculating of the measured vibration may include characterizing the vibrations to identify presence of any defects. The calculating of the measured vibration may include measuring or extracting parameters critical for evaluation of the structure, including amplitude of displacement, velocity, and vibrational frequency of the structure under evaluation at every measurement spot (laser beam 109), and dynamics of this values with time after excitation.

Human readable information is presented corresponding to the processed data that represents the measured vibration (block 318). An operator of the ground station 103 may review this human readable information and decide whether further inspection is desired or whether inspection of the inspection area 108 has been adequately completed. One mechanism of presenting human readable information includes displaying on a graphical user interface 290 a mapping of vibration frequency and vibration amplitude at different locations on a surface of a structure (structure under evaluation 101).

A human may review the human readable information and decide to either (i) proceed with further inspection of the inspection area 108, or (ii) not proceed with further inspection of the inspection area 108 (decision point 320). In further embodiments, a machine algorithm may review the processed data that represents the measured vibration and recommend a decision to a human reviewing the human readable information. In further instances, the machine algorithm proceeds autonomously without human review. In yet further instances, the machine algorithm proceeds autonomously without human review and the processed data corresponding to the human readable information is stored for later review by a human inspector.

In response to further inspection being desired, the cycle may be repeated beginning at block 306. At block 306, optics 212 may be adjusted, or instructions to reposition the mobile sensing platform 100 may be provided, so that inspection of the inspection area 108 may continue and accuracy and precision of the inspection enhanced.

In response to further inspection being not desired, a new inspection cycle may commence with an inspection of a new inspection area 108. Thus, the cycle may be repeated beginning at block 302. A new inspection area 108 and flight path to that inspection area 108 may be set, whether by manual or automated processes, and whether by onboard electronics or pursuant to instructions received from ground station 103, and the method repeats for the new inspection area. In response to there being no remaining inspection areas of interest to set, the method may terminate.

In the discussion above, and particularly, during the discussion of block 316, reference was made to performing calculations to measure vibration, or stated differently, the processing of data to characterize detected vibrations. Such processing may include more specific data manipulation performed on data from the sensor 215, the imaging camera 221, and the accelerometer 231. For instance, for each laser beam 109 of the beam array 107, the sensor 215 may detect signals to be used for computation of a normal component of surface displacement $\Delta_{\perp Dj}$, velocity $v_D(t)$, and a Fourier spectrum $\mathcal{F}(v_D, t)$ of surface vibration. At the same time, the accelerometer 231 may measure corresponding velocity and Fourier spectrum values for the movement (e.g., vibration) of the mobile sensing platform 100. Because the movement of the mobile sensing platform 100 can introduce inaccuracies into the measurement of the sensor 215, the data generated by the sensor 215 can be processed to diminish errors introduced by movement of the mobile sensing platform 100. For instance, detected vibrational spectral components of accelerometer 231 $\mathcal{F}_{AC}(f,t)$ overlapping with those in the frequency band $\mathcal{F}_{Dj}(f,t)$ of the sensor 215 may be disregarded from further analysis. Thus, one aspect of the data processing may be performing data discrimination by using an XOR operation defined as $\mathcal{F}_{AC} \oplus \mathcal{F}_{Dj}$ where both inputs can have to values 0 and 1. The XOR discrimination may be performed for the vibrational velocity component through gating operation $v_{AC}$ XOR $v_{Dj}$ and may be performed for the normal displacement component through gating operation $\Delta_{\perp AC}$ XOR $\Delta_{\perp Dj}$. The resultant data is synchronized, resulting in a set of values for that can be used for mapping local displacement and velocity in a spatio-temporal mode for matching displacement $\Delta_{\perp Dj}$ and velocity $v_{Dj}$ maps. This mapping is achieved by adapting a Discrete Graphics Processing Unit (DGPU) to render an image for human readable display.

For instance, referring to FIG. 4 (and with ongoing reference to elements of FIGS. 1 and 2), a graph 400 shows a relationship between linear displacement 402 (amplitude 402) of a spot associated with a single laser beam 109 of the beam array 107 and frequency 404 of the spot. For a given spot, multiple different vibrational modes may be present having different amplitudes (linear displacements) and frequencies. For instance, an example spectra 406 shows different vibrational modes. A frequency threshold may be established for frequency 404 and an amplitude threshold may be established for amplitude 402. Moreover, different amplitude thresholds may be associated with different vibratory frequencies. For instance, a relatively higher frequency vibration may be associated with the presence of a local crack or discontinuity in a structure. Thus, a lower amplitude threshold may be established for higher frequency vibrations. By analyzing a relationship between frequency and amplitude, defects may be detected in a structure. Moreover, many such relationships may be mapped across a surface of the structure. For instance, a multiplicity of laser beams 109 of the beam array 107 may be spread across the surface of the structure under evaluation 101. In this manner, errors associated with localized anomalies maybe ameliorated. For instance, a single laser beam 109 may have an associated high amplitude and high vibrational frequency because the beam is backscattering from a localized article on a road surface not related to bridge structure, whereas neighboring laser beams 109 may have an associated lower amplitude or lower frequency vibration not indicative of a defect. By combining data from many laser beams 109 of a plurality of laser beams (a beam array 107), more accurate defect detection is possible. Moreover, local filters may be instantiated to counter the deleterious noise generated by acceleration of the mobile sensing platform 100. Such filters may be overlaid on the data associated with graph 400 to correct the spectra 406 to cancel or ameliorate noise.

Referring to FIGS. 5A through 9C, various depictions of data retrieved from laser Doppler vibrometery measurements are illustrated. Variations in shading and/or isolines reflects Z-axis displacement (displacement normal to a surface) of a test specimen. Referring to FIGS. 5A-C, a top view of various examples of test specimens having or not having defects is shown. For instance, FIG. 5A depicts extended in X-Y plane a magnitude of Z-axis displacement $\Delta_{LDj}$ in form of a map of isolines 510 characteristic (or typical) for a bending mode of the slab-type specimen 500. Notably, the magnitude of $\Delta_{LDj}$ displacement varies across the X-Y plane without abrupt discontinuity or areal clustering. FIG. 5A depicts a specimen not having defects, thus not exhibiting local discontinuities or areal clustering. FIG. 5B depicts a map of isolines 545 for $\Delta_{LDj}$ displacement 540 of a slab-type specimen 500 with a defect 550 near a central area of the slab-type specimen 500. FIG. 5C depicts a different representation of the magnitude of $\Delta_{LDj}$ displacement 565 of a surface extending in an X-Y plane, but with a defect 570 near the central area of the figure. Notably, spatial variances in color (or gray level) in a surface map 560 of a slab-type specimen reveals a magnitude of displacement 565 and location of the defect 570.

Figure 6A:
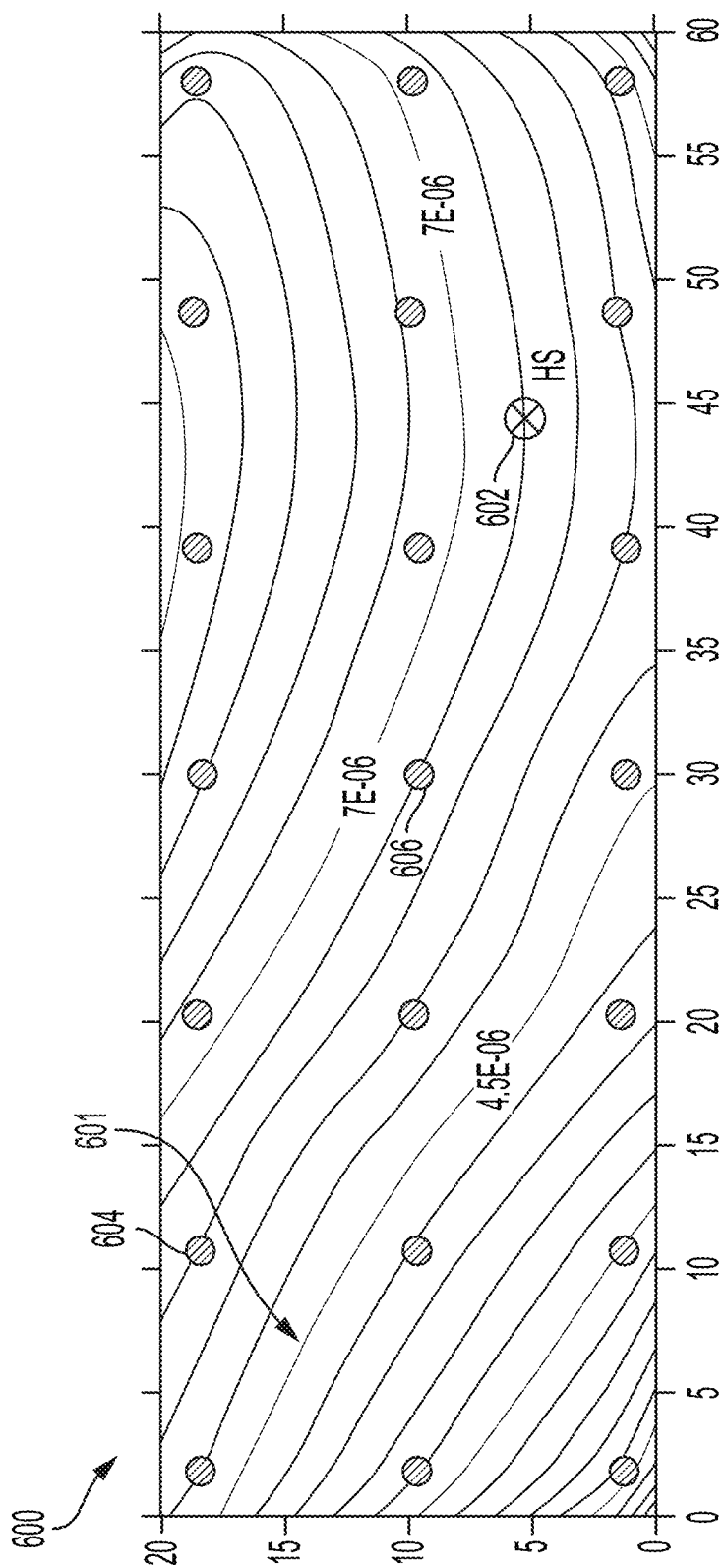
FIG. 6A depicts a magnitude of displacement of a surface not having a defect, in accordance with various embodiments.
Figure 6B:
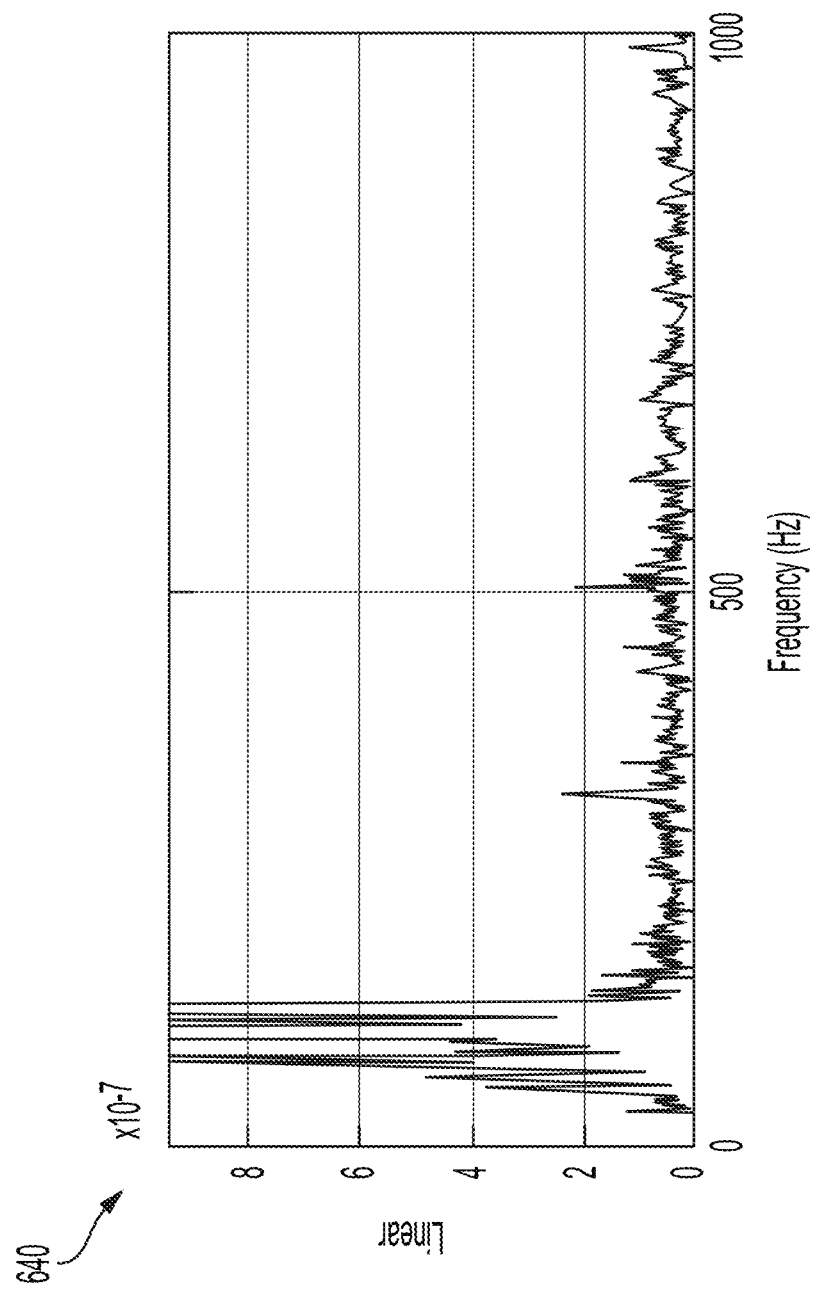
FIGS. 6B-C depict Fourier spectra of vibration detected at different locations on the surface of FIG. 6A, in accordance with various embodiments.
Figure 6C:
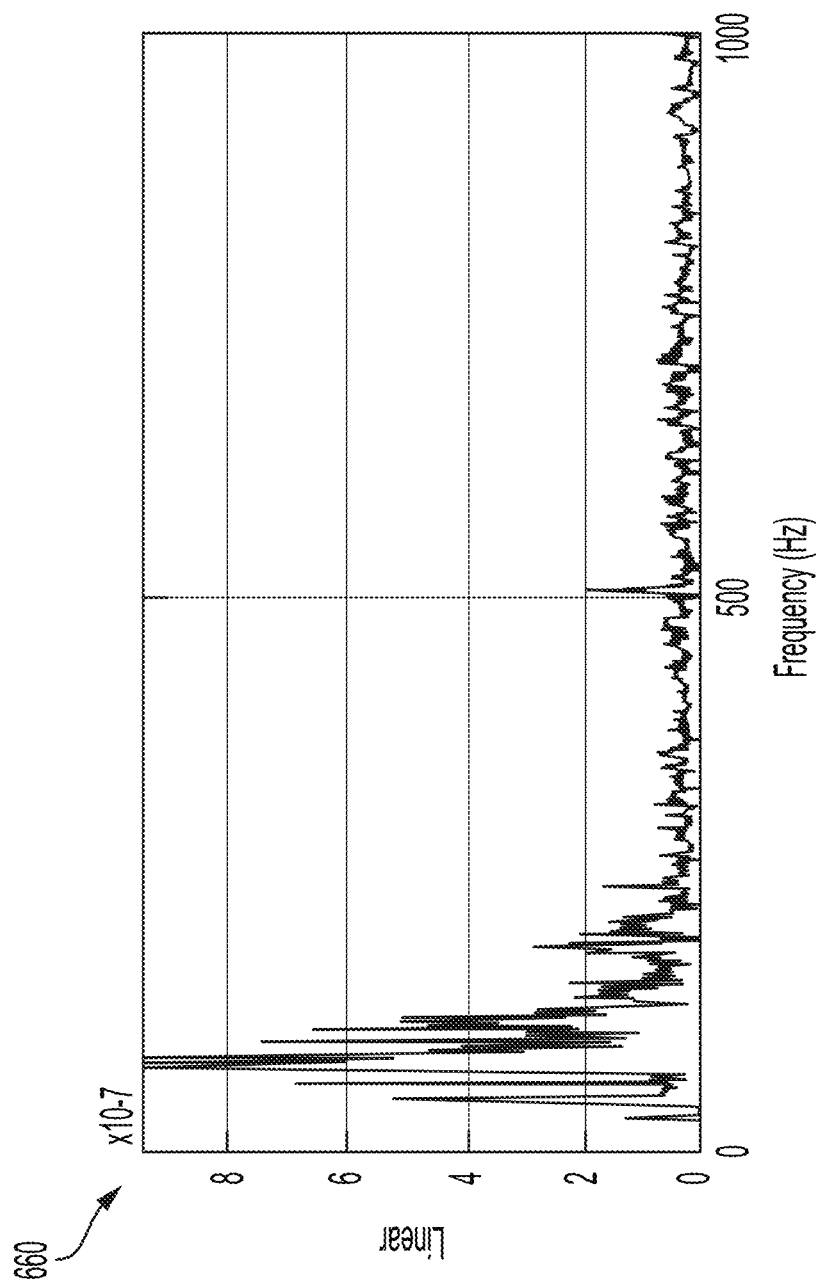

FIGS. 6A-C depicts further mechanical properties of a slab-type specimen 600 not having a defect. For instance, FIG. 6A depicts a magnitude of isolines of $\Delta_{LDj}$ displacement 601 of a surface extending in an X-Y plane. The surface is excited by dropping a 4 pound (1.8 kg) weight at hit spot 602. A character of a bending mode of the slab as it vibrates in response to the exciting is measured 26 ms after the slab-type specimen 600 is contacted by the weight at the hit spot 602. Each spot exemplified by dots 604 and 606 represents a location corresponding to a laser beam 109 (FIG. 1) of a beam array 107 (FIG. 1). The measurements are performed simultaneously in all spots of the beam array marked on the slab-type specimen 600. FIG. 6B illustrates a Fourier spectra of vibration of the signal measured at the first location 604 in FIG. 6A. Similarly, a measurement of Fourier spectra of vibration in second location 606 is depicted in 660 of FIG. 6C. Comparison of Fourier spectra 640 of FIG. 6B and 660 of FIG. 6C and reveals their similarity.

Figure 7A:
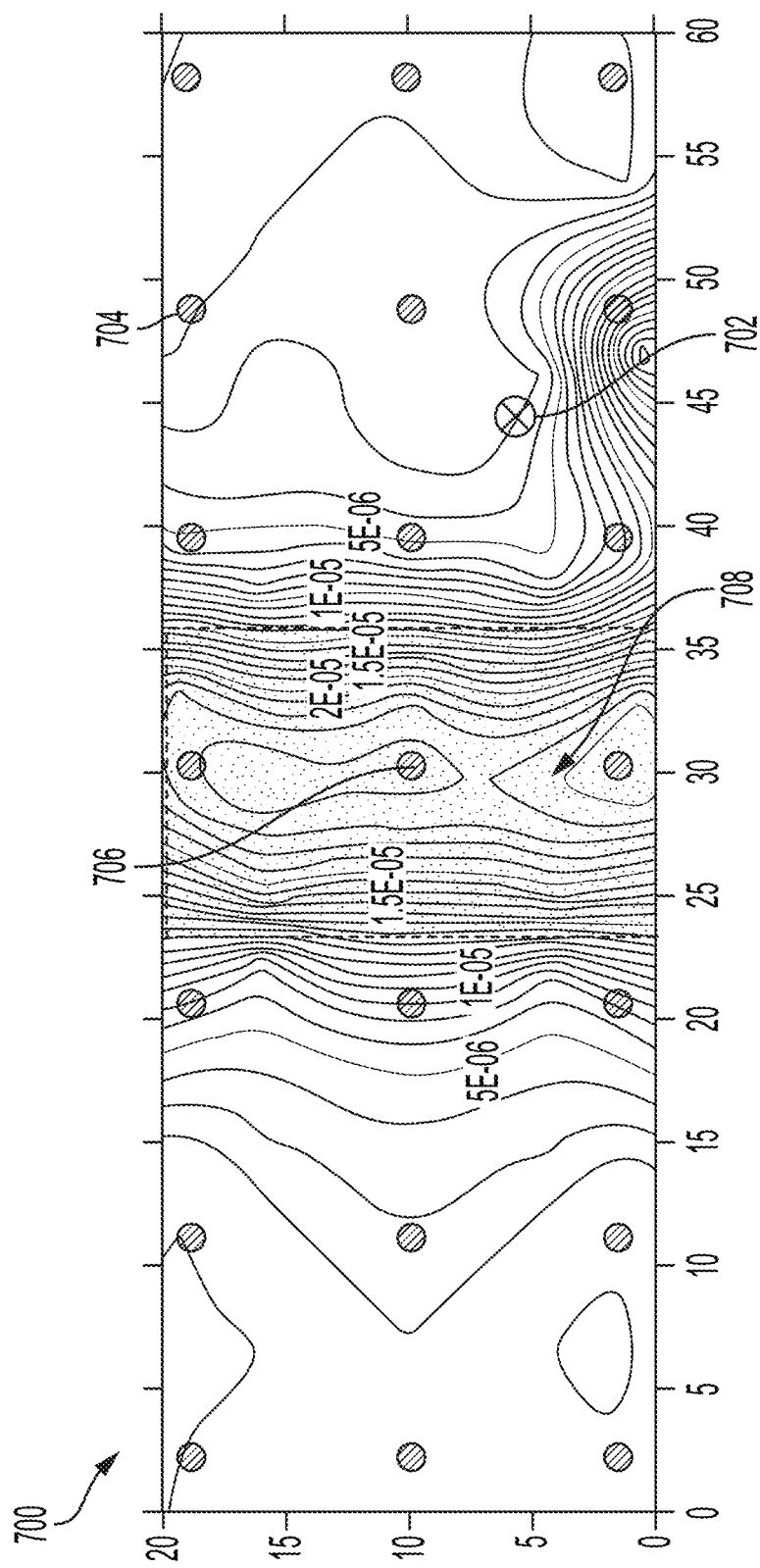
FIG. 7A depicts a magnitude of displacement of a surface having a large, shallow defect, in accordance with various embodiments.
Figure 7B:
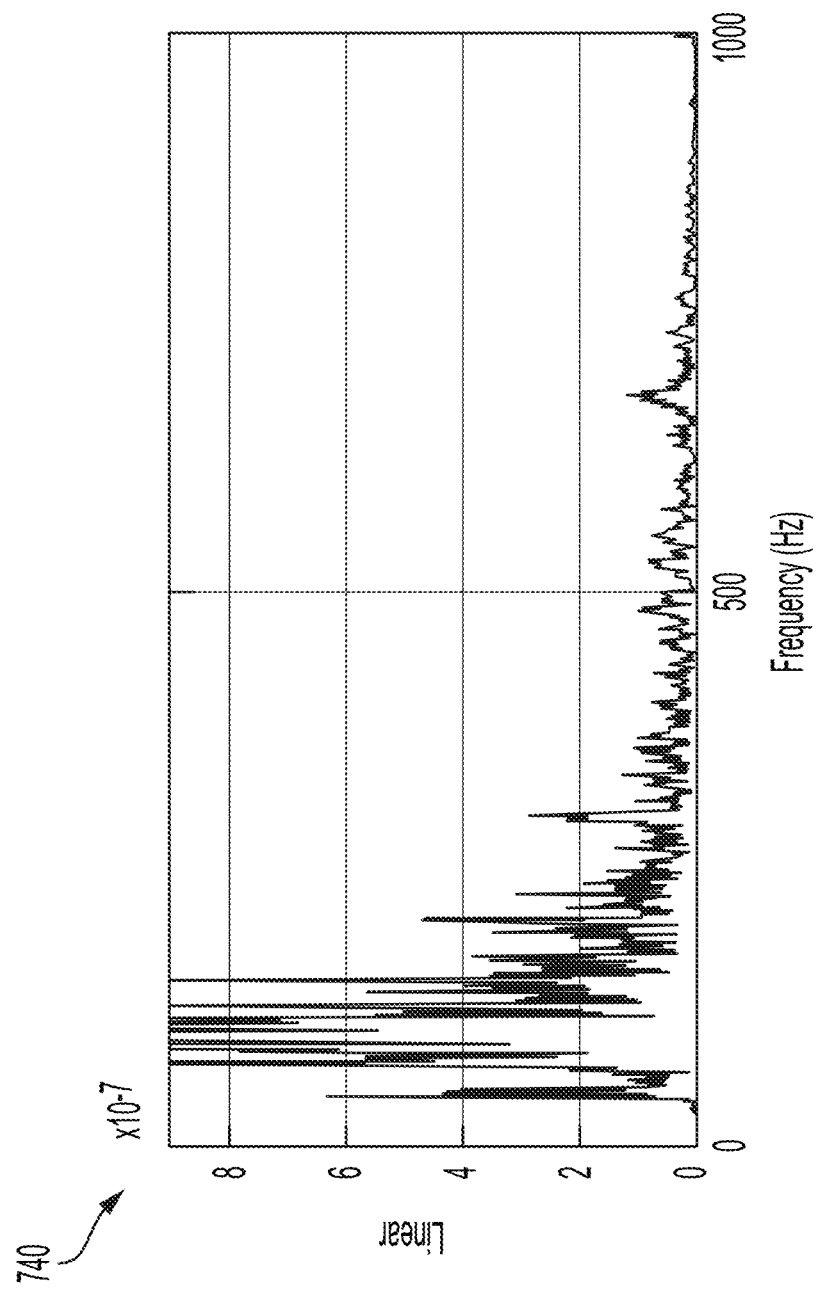
FIGS. 7B-C depict Fourier spectra of vibration detected at different locations on the surface of FIG. 7A, in accordance with various embodiments.
Figure 7C:
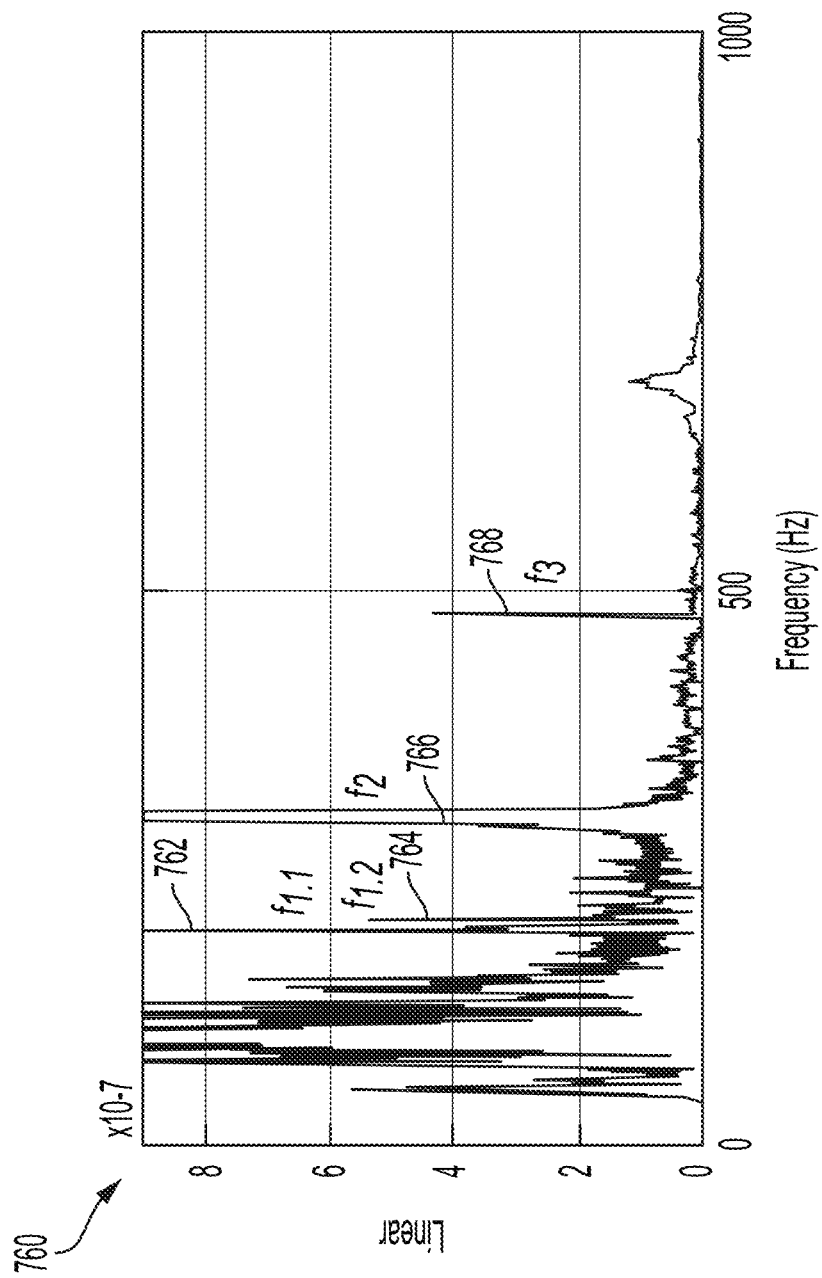

FIGS. 7A-C depicts further mechanical properties of a slab type test-specimen having a large shallow defect. For instance, FIG. 7A depicts a magnitude of $\Delta_{LDj}$ displacement of a slab-type specimen 700 extending in an X-Y plane. The test-slab is excited by dropping a 4 pound (1.8 kg) weight at hit spot 702. A character of a vibrational mode of the slab as it vibrates in response to the exciting is measured 26 ms after the surface is contacted by the weight at the hit spot 702. Each dot represents a location corresponding to a laser beam 109 (FIG. 1) of a beam array 107 (FIG. 1). First location 704 is measured and a Fourier spectra of vibration at the first location 704 is depicted in FIG. 7B as first Fourier spectra 740. Similarly, second location 706 is measured and a Fourier spectra of vibration at the second location 706 is depicted in FIG. 7C as second Fourier spectra 760.

Notably, and with reference to FIG. 7C, the second Fourier spectra 760 contains multiple significant frequency components. First frequency component 762 and second frequency component 764 can be identified as split mode harmonics of the surface with the defect. Third frequency component 766 and fourth frequency component 768 can be identified as harmonics of the modes associated with the vibration of the defect area of the slab measured from its surface. Thus, one may appreciate that a processor may automatically identify the surface as including a defect via a Fourier analysis.

Figure 8A:
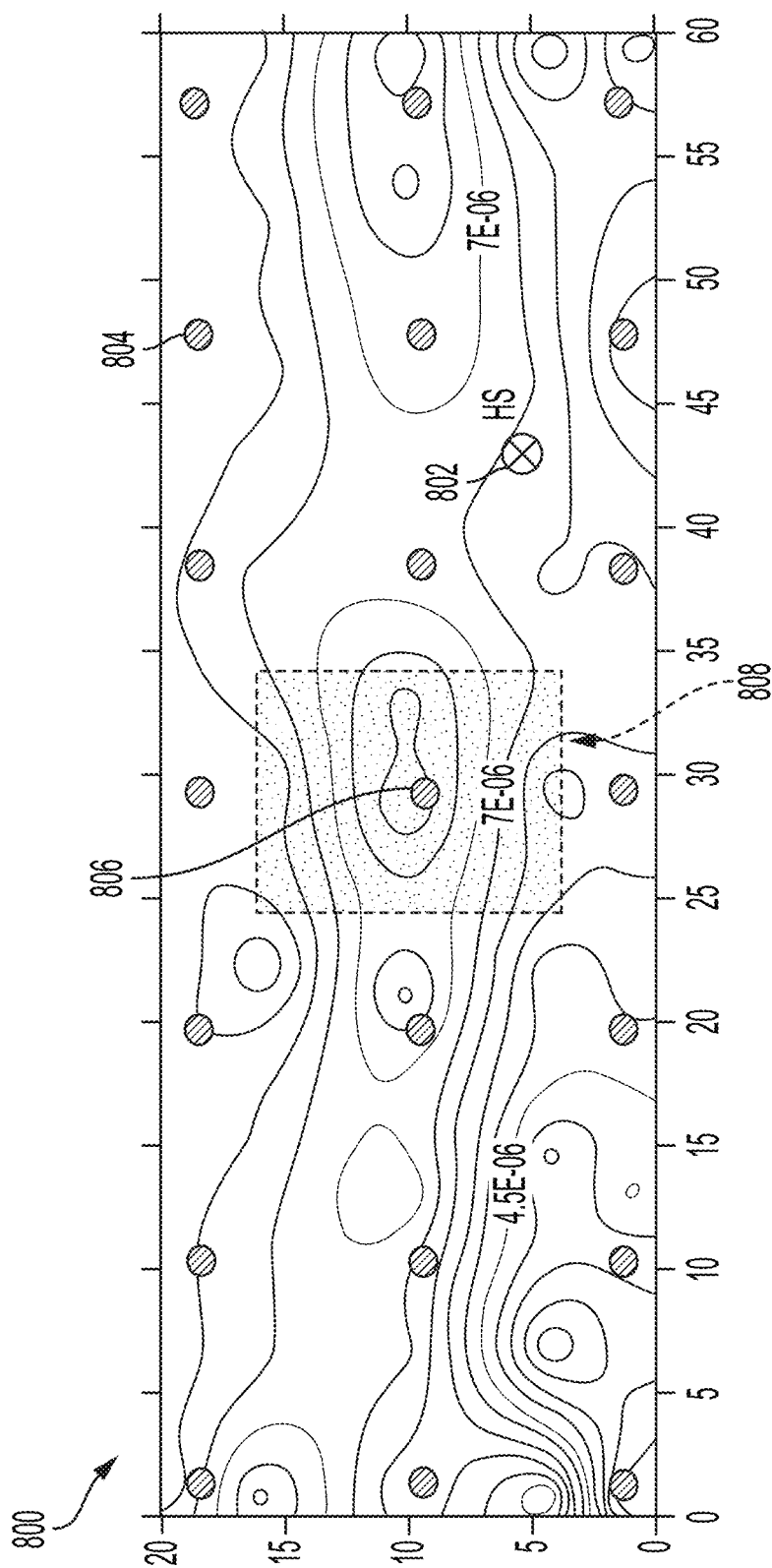
FIG. 8A depicts a magnitude of displacement of a surface having a small, shallow defect and a plurality of laser beams casting laser spots onto the surface, in accordance with various embodiments.
Figure 8B:
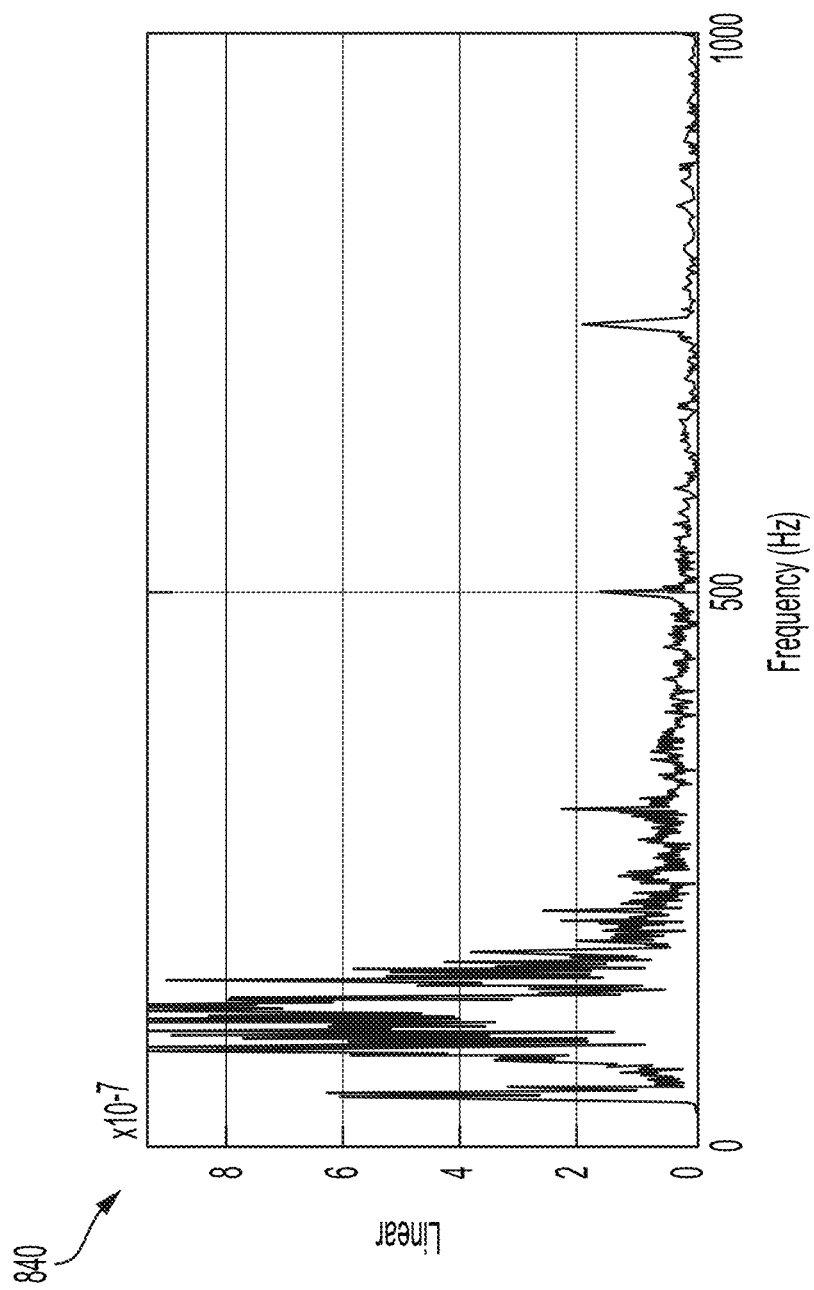
FIGS. 8B-C depict Fourier spectra of vibration detected at different locations on the surface of FIG. 8A, in accordance with various embodiments.
Figure 8C:
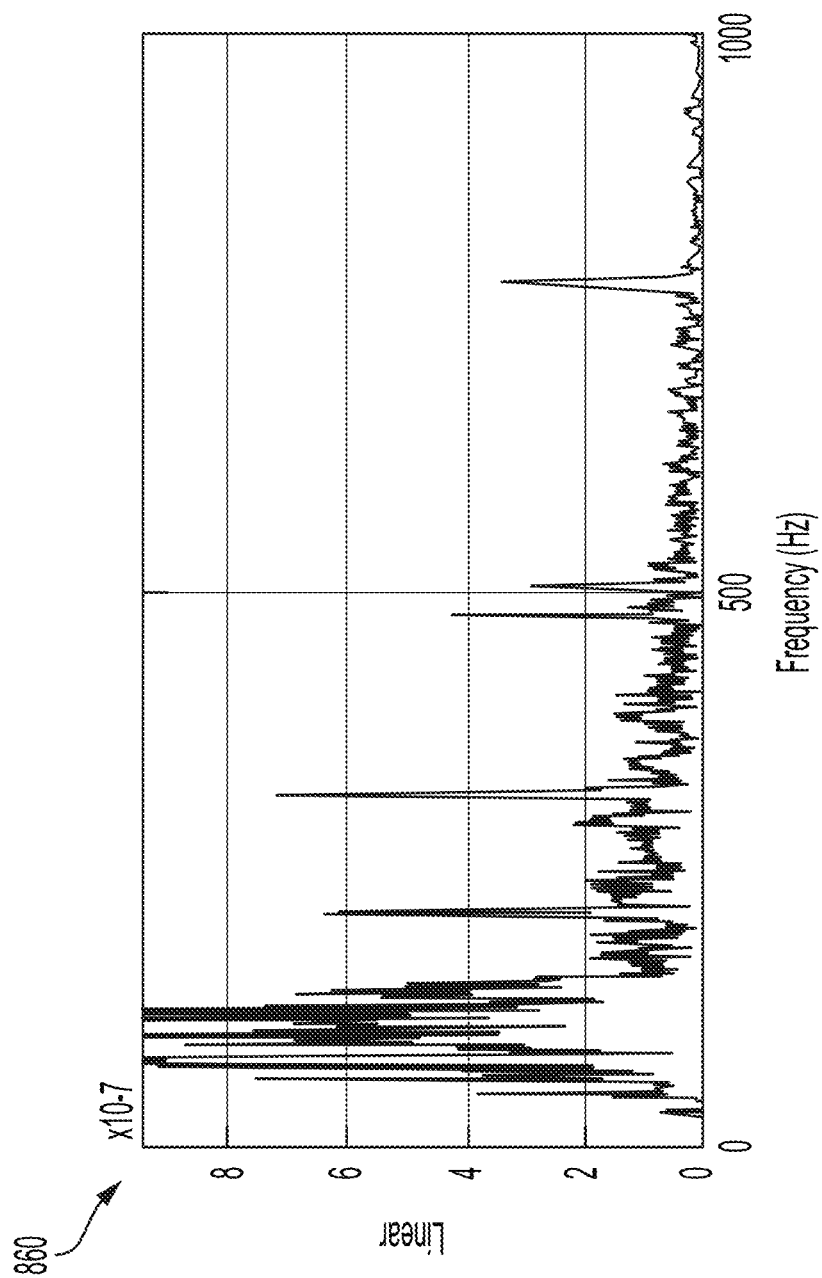

FIGS. 8A-C depicts further mechanical properties of a surface having a small shallow defect. For instance, FIG. 8A depicts a magnitude of $\Delta_{LDj}$ displacement of a slab-type specimen 800 extending in an X-Y plane. The surface is excited by dropping a 4 pound (1.8 kg) weight at hit spot 802. A character of a twist mode of the slab as it vibrates in response to the exciting is measured 26 ms after the surface is contacted by the weight at the hit spot 802. Each dot (laser spot) represents a location corresponding to a laser beam 109 (FIG. 1) of a beam array 107 (FIG. 1). First location 804 is measured and a Fourier spectra of vibration at the first location 804 is depicted in FIG. 8B as first Fourier spectra 840. Similarly, second location 806 is measured and a Fourier spectra of vibration at the second location 806 is depicted in FIG. 8C as second Fourier spectra 860.

Figure 9A:
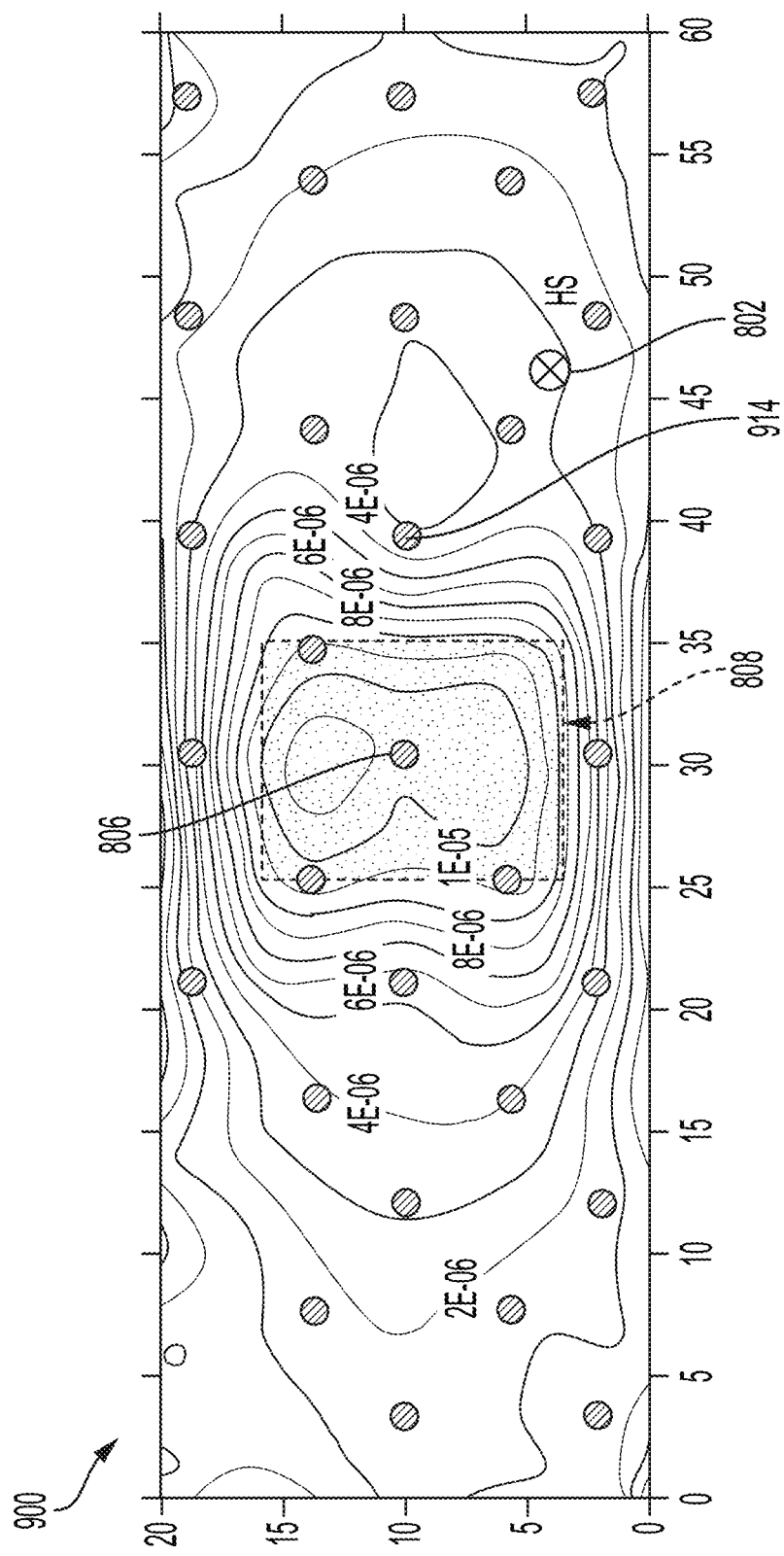
FIG. 9A depicts a magnitude of displacement of a surface having a small, shallow defect according to FIG. 8A but with a differently spaced plurality of laser beams, in accordance with various embodiments.
Figure 9B:
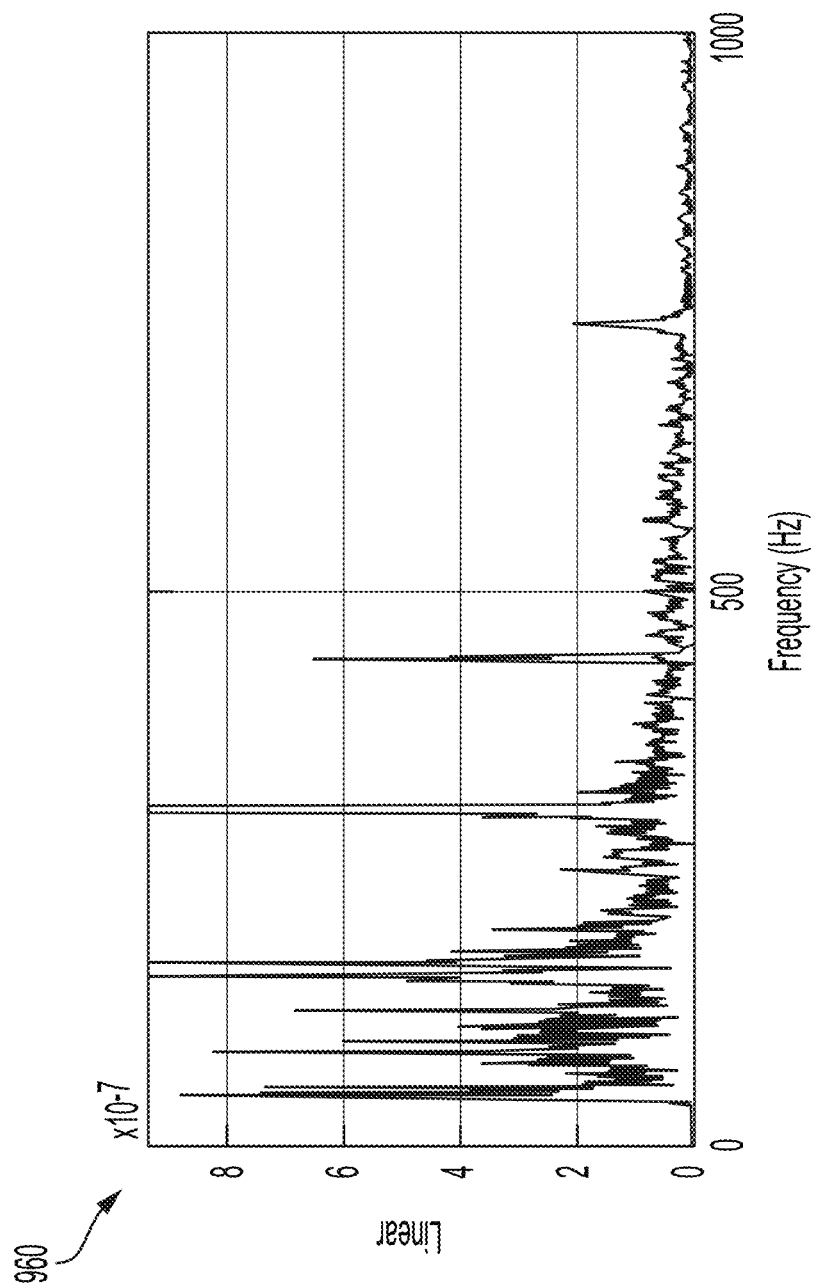
FIGS. 9B-C depict Fourier spectra of vibration detected at different locations on the surface of FIG. 9A.
Figure 9C:
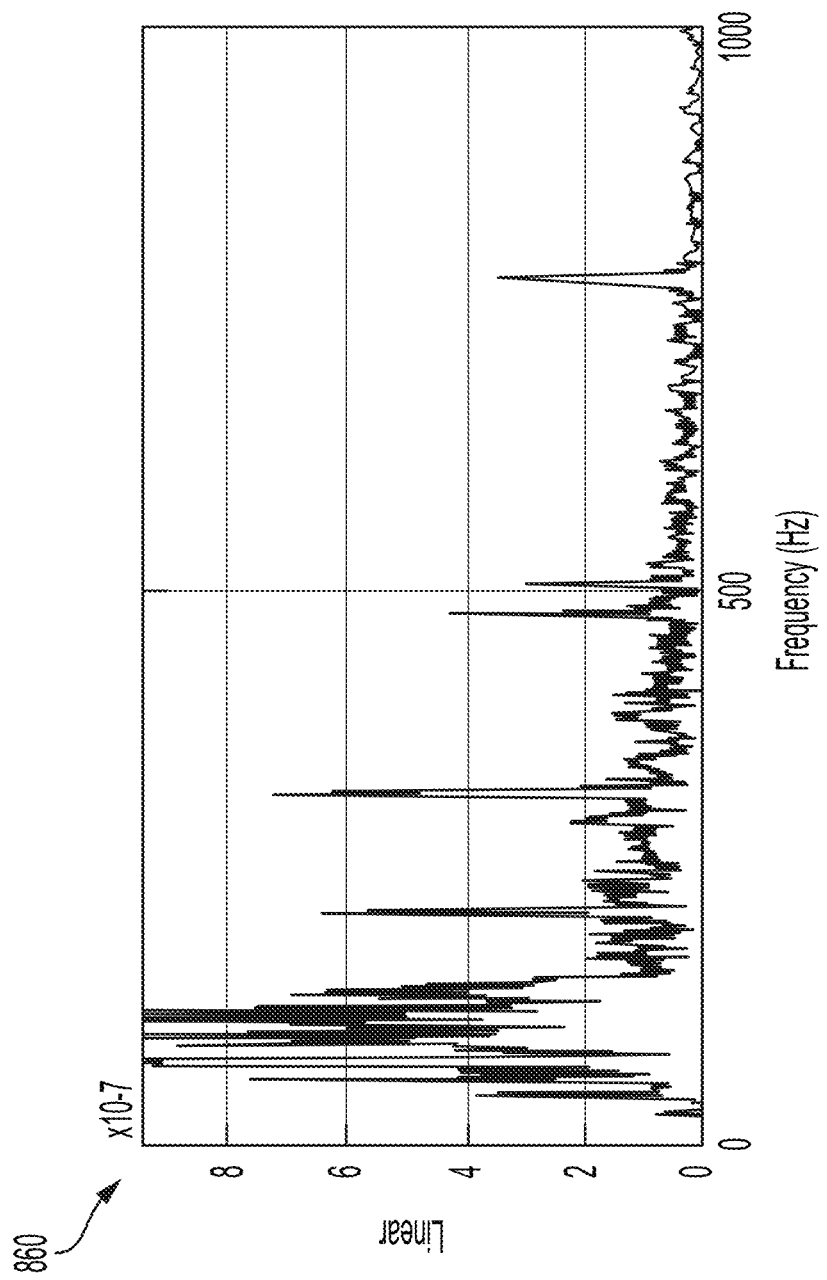

FIGS. 9A-C depict an important difference relative to FIGS. 8A-C. FIG. 9A depicts the same area as FIG. 8A being excited identically to FIG. 8A. For instance, like reference numerals are used throughout with the exception of a third location 914 being depicted and the first location 804 being omitted. FIGS. 9A-C depict mechanical properties of the surface having the small shallow defect. FIG. 9A depicts a magnitude of displacement of the slab-type specimen 900 extending in an X-Y plane. The surface is excited by dropping a 4 pound (1.8 kg) weight at hit spot 802. A character of a twist mode of the slab as it vibrates in response to the exciting is measured 26 ms after the surface is contacted by the weight at the hit spot 802. Each dot (laser spot) represents a location corresponding to a laser beam 109 (FIG. 1) of a beam array 107 (FIG. 1). First location 804 (FIG. 8A) is omitted. Notably, the array of dots representing locations corresponding to the laser beam 109 (FIG. 1) of the beam array 107 (FIG. 1) is different than in FIG. 8A. Specifically, the array of dots is denser with less space between the dots. Consequently, measurements are made at different locations on the surface than in FIG. 8A. By increasing the density of the array, small defects are more accurately and precisely identified. The density of the array is variable to ameliorate aliasing during measurement collection. In FIG. 9A, while first location 804 (FIG. 8A) is omitted, notably third location 914 is introduced. Second location 806 remains in the same location. FIG. 9B depicts a third Fourier spectra 960 of the third location 914. FIG. 9C depicts the second Fourier spectra 860 of the second location 806 identically to FIG. 8B.

Notably, the third Fourier spectra 960 of the third location 914 reveals a twist mode indicative of presence of a defect, while the first Fourier spectra 840 (FIG. 8B) of the first location 804 (FIG. 8A) did not reveal a twist mode indicative of presence of the defect. Consequently, different defects may be detected in response to adjustment of a spacing among laser beams 109 (FIG. 1) of the plurality of laser beams making up the beam array 107 (FIG. 1).

The measured frequencies, displacements and velocity may, in various embodiments, indicate that a localized resonance is occurring so that a localized vibrating mass may have a physical discontinuity causing the resonant frequency to increase relative to a defect-free mass. Moreover, measurement of local deflection (or, a localized vibratory amplitude) exceeding a threshold may indicate presence of a defect. For instance, if a surface is bending too far, then a defect is present. Various detection schemes, including detection in response to machine learning and/or artificial intelligence may be implemented.

Exemplary embodiments of the systems, apparatuses, and methods have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for remote vibration-based evaluation of a structure, the system comprising:
    a laser Doppler vibrometer configured to project a plurality of laser beams onto the structure;
    a sensor configured to receive a backscattered light of at least one laser beam of the plurality of laser beams that is backscattered from the structure and to generate a sensor data; and
    an accelerometer configured to detect a motion of a mobile sensing platform carrying the sensor and generate accelerometer data,
    wherein the laser Doppler vibrometer, the sensor, and the accelerometer are configured to connect to a transmitter to transmit data corresponding to (i) the sensor data and (ii) the accelerometer data, and
    wherein at least one of (a) an amplitude, (b) a phase, and (c) a frequency of the backscattered light corresponds to a combination of the motion of the mobile sensing platform and a vibration of the structure.

2. The system according to claim 1, wherein the frequency or the phase of the backscattered light comprises a frequency change or a phase change relative to a frequency or a phase of a reference beam of a local oscillator.

3. The system according to claim 1,
    wherein the mobile sensing platform comprises an unmanned aerial vehicle,
    wherein the structure comprises a bridge, and
    wherein the vibration of the structure is generated by vehicles passing across the bridge and not by a single-mode vibration source.

4. The system according to claim 1, further comprising optics disposed between the laser Doppler vibrometer and the structure, the optics including a zoom lens operable to change a spacing between laser beams of the plurality of laser beams.

5. The system according to claim 1, further comprising a beam splitter having a first output positioned adjacent the sensor and having a second output configured to be positioned adjacent to an imaging camera.

6. The system according to claim 5, further comprising the imaging camera, wherein the transmitter is further configured to transmit data corresponding to an image of the structure that is collected by the imaging camera during the collecting of the sensor data.

7. The system according to claim 1, further comprising a global positioning system (GPS) receiver to generate location data corresponding to a location of the mobile sensing platform during the collecting of the sensor data, wherein the transmitter is further configured to transmit the location data.

8. The system according to claim 1, further comprising a remote processor configured to receive the sensor data and the accelerometer data from the transmitter and operable to use the accelerometer data to filter from the sensor data a vibration that is associated with the motion of the mobile sensing platform having the sensor and that is not associated with the vibration of the structure.

9. The system according to claim 1, wherein the sensor includes multiple sensor elements and detects the backscattered light from the plurality of the laser beams at a same time.

10. An unmanned aerial vehicle for sensing a motion of a structure, the unmanned aerial vehicle comprising:
    a drone configured to fly above the structure;
    a laser Doppler vibrometer attached to the drone and projecting a plurality of laser beams onto the structure;
    a sensor attached to the drone and detecting backscattered light from the plurality of the laser beams as the plurality of the laser beams backscatter from the structure,
    the sensor generating sensor data corresponding to the detected backscattered light;
    an accelerometer attached to the drone and measuring acceleration of the drone and generating accelerometer data corresponding to the acceleration of the drone; and
    a transmitter receiving data corresponding to the sensor data and the accelerometer data and transmitting the data to a processor.

11. The unmanned aerial vehicle according to claim 10, wherein the processor is a remote processor disposed remotely from the unmanned aerial vehicle.

12. The unmanned aerial vehicle according to claim 10, wherein the processor receives the data corresponding to the sensor data and the accelerometer data from the transmitter and uses the accelerometer data to filter from the sensor data the acceleration of the drone that is not associated with the motion of the structure.

13. The unmanned aerial vehicle according to claim 10, wherein the sensor is a component of the laser Doppler vibrometer.

14. The unmanned aerial vehicle according to claim 10, further comprising an imaging camera capturing an image of an area of the structure onto which the plurality of laser beams is projected.

15. The unmanned aerial vehicle according to claim 14, further comprising a beam splitter connecting to the imaging camera and to the sensor.

16. The unmanned aerial vehicle according to claim 10, further comprising optics disposed between the laser Doppler vibrometer and the structure and attached to the drone, the optics including a zoom lens operable to change a spacing between laser beams of the plurality of laser beams projected onto the structure.

17. The unmanned aerial vehicle according to claim 10, further comprising a global positioning system (GPS) receiver, wherein the transmitter receives data from the global positioning system (GPS) receiver corresponding to a location of the drone during the generating the sensor data and transmits the data corresponding to the location of the drone to the processor.

18. A method of measuring a motion of a structure, the method comprising:
    projecting, by a laser Doppler vibrometer, a plurality of laser beams onto the structure;

receiving, by a sensor, a backscattered light of at least one laser beam of the plurality of laser beams that is backscattered from the structure and generating a sensor data;

detecting, by an accelerometer, a motion of a mobile sensing platform carrying the sensor and generating accelerometer data; and transmitting, by a transmitter connected to the laser Doppler vibrometer, the sensor, and the accelerometer, data corresponding to (i) the sensor data and (ii) the accelerometer data, for receipt by a remote processor.

19. The method according to claim 18, further comprising calculating, by the remote processor, at least one of a frequency and an amplitude of the motion of the structure from the data corresponding to the sensor data and the accelerometer data, wherein an exceeding by the frequency and the amplitude of the motion beyond a threshold amplitude at a threshold frequency corresponds to a presence of a mechanical defect in the structure.

20. The method according to claim 19, further comprising displaying on a graphical user interface a mapping of the frequency and the amplitude of the motion at different locations on a surface of the structure.

\* \* \* \* \*

UNITED STATES PATENT AND TRADEMARK OFFICE
CERTIFICATE OF CORRECTION

PATENT NO. : 11,467,096 B1
APPLICATION NO. : 17/554981
DATED : October 11, 2022
INVENTOR(S) : Vladimir Markov Page 1 of 1

It is certified that error appears in the above-identified patent and that said Letters Patent is hereby corrected as shown below:

On the Title Page

Item (60), "Provisional application No. 63,234,634" is replaced by --Provisional application No. 63/234,643--.

Signed and Sealed this
Twenty-fourth Day of January, 2023

Katherine Kelly Vidal
*Director of the United States Patent and Trademark Office*